US011641603B2

(12) United States Patent
Pakniat et al.

(10) Patent No.: US 11,641,603 B2
(45) Date of Patent: *May 2, 2023

(54) REPORT NSA/SA NR INDICATOR

(71) Applicant: Telefonaktiebolaget LM Ericsson (publ), Stockholm (SE)

(72) Inventors: Parisa Pakniat, Norrköping (SE); Icaro L. J. Da Silva, Solna (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

This patent is subject to a terminal disclaimer.

(21) Appl. No.: 17/147,706

(22) Filed: Jan. 13, 2021

(65) Prior Publication Data

US 2021/0211949 A1 Jul. 8, 2021

Related U.S. Application Data

(63) Continuation of application No. 16/479,486, filed as application No. PCT/EP2018/077572 on Oct. 10, 2018, now Pat. No. 10,911,993.

(Continued)

(51) Int. Cl.
*H04W 36/00* (2009.01)
*H04W 92/20* (2009.01)

(52) U.S. Cl.
CPC ... *H04W 36/0061* (2013.01); *H04W 36/0083* (2013.01); *H04W 92/20* (2013.01)

(58) Field of Classification Search
CPC .......... H04W 36/08; H04W 88/08; H04W 36/00835; H04W 36/30; H04W 36/0094;

(Continued)

(56) References Cited

U.S. PATENT DOCUMENTS 8,341,289 B2 12/2012 Hellhake et al.
10,412,642 B2 9/2019 Axmon et al.
(Continued)

FOREIGN PATENT DOCUMENTS

CN 102238516 A 11/2011
CN 102638834 A 8/2012
(Continued)

OTHER PUBLICATIONS

3GPP TSG RAN WG2 Meeting #95 R2-165128 Source: KT Corp. Title Support of standalone and non-standalone NR RAN modes Gothenburg, Sweden, Aug. 22-26, 2016 (Year: 2016).*

(Continued)

*Primary Examiner* — Nizar N Sivji
(74) *Attorney, Agent, or Firm* — Rothwell, Figg, Ernst & Manbeck, P.C.

(57) ABSTRACT

A wireless device configured to acquire network support information associated with a neighbor cell, wherein the network support information indicates that the neighbor cell supports a Stand-Alone (SA) mode of operation and/or a Non-Stand-Alone (NSA) mode of operation; and transmit to a serving network node a report comprising identification information associated with the neighbour cell and the network support information indicating that the neighbor cell supports a SA mode of operation and/or a NSA mode of operation. A serving network node configured to receive a report transmitted by a wireless device, wherein the report comprises identification information associated with the neighbor cell and network support information indicating that the neighbor cell supports a Stand-Alone (SA) mode of operation and/or a Non-Stand-Alone (NSA) mode of operation; and determine, based on the report, a type of interface to establish between the serving network node and the neighbor network node.

21 Claims, 20 Drawing Sheets

Related U.S. Application Data

(60) Provisional application No. 62/570,341, filed on Oct. 10, 2017.

(58) Field of Classification Search
CPC ........... H04W 36/305; H04W 36/0033; H04W 36/0055; H04W 36/0088; H04W 36/0077; H04W 36/0072; H04W 36/06; H04W 48/20; H04W 36/00; H04W 36/0061; H04W 36/0083; H04W 92/20
See application file for complete search history.

(56) References Cited

U.S. PATENT DOCUMENTS

| | | |
|---|---|---|
| 2006/0217146 A1 | 9/2006 | Cheng et al. |
| 2008/0080436 A1 | 4/2008 | Sandhu et al. |
| 2010/0210268 A1* | 8/2010 | Lim ................... H04W 48/08 455/436 |
| 2015/0373599 A1 | 12/2015 | Kim et al. |
| 2016/0088534 A1 | 3/2016 | Axmon et al. |
| 2016/0165529 A1 | 6/2016 | Jin |
| 2016/0212775 A1 | 7/2016 | Xu et al. |
| 2018/0049078 A1 | 2/2018 | Yang et al. |
| 2019/0037480 A1 | 1/2019 | Sun et al. |
| 2020/0145843 A1 | 5/2020 | Yang |
| 2020/0305015 A1 | 9/2020 | Yang |
| 2020/0322854 A1 | 10/2020 | Ryoo et al. |
| 2021/0211949 A1 | 7/2021 | Pakniat et al. |

FOREIGN PATENT DOCUMENTS

| | | |
|---|---|---|
| CN | 108632923 A | 10/2018 |
| CN | 108696881 A | 10/2018 |
| JP | 2020-533816 A | 11/2020 |
| RU | 2 523 046 | 7/2014 |
| WO | 2018/084755 A1 | 5/2018 |
| WO | 2019/072904 | 4/2019 |
| WO | 2019/215680 A1 | 11/2019 |

OTHER PUBLICATIONS

Qualcomm Incorporated, et al., "Considerations on NR indication", 3GPP TSG-RAN WG2 Meeting #99, R2-1707879, Berlin, Germany, Aug. 21-25, 2017 (2 pages).

LG Electronics Inc., "ANR for NR", 3GPP TSG-RAN2#99bis, R2-1711680 (Resubmission of RS-1709128), Prague, Czech, Oct. 9-13, 2017 (2 pages).

Samsung, "NSA procedure: measurement result contents and its encoding for SN addition", 3GPP TSG-RAN WG2 #99, R2-1709022, Berlin, Germany, Aug. 21-25, 2017 (2 pages).

Ericsson, "ANR framework in NR", 3GPP TSG-RAN VVG2 #99bis, Tdoc R2-1710842, Prague, Czech Republic, Oct. 2017 (5 pages).

OPPO, "Discussion on the on demand SI", 3GPP TSG RAN WG1 Meeting 90bis, R1-1718773, Prague, CZ, Oct. 2017 (3 pages).

Nokia et al., "UE capability structure and coordination aspects for MR-DC", 3GPP TSG-RAN WG2 NR Adhoc #2, R2-1706859, Qingdao, China, Jun. 2017 (15 pages).

ERICSSON, "ANR for NSA NR", 3GPP TSG-RAN WG2 #98, Tdoc R2-1704108, Hangzou, P.R. of China, May 2017, 5 pages.

Extended Search Report issue in corresponding European Application No. 192160463.3, dated Jun. 19, 2020, 6 pages.

International Search Report and Written Opinion dated Dec. 19, 2018 issued in International Application No. PCT/EP2018/077572. (15 pages).

KT Corp., "Support of standalone and non-standalone NR RAN modes", 3GPP TSG RAN WG2 Meeting #95; R2-165128; Gothenburg, Sweden (Aug. 2016). (3 pages).

Vivo, "NR PBCH Content", 3GPP TSG-RAN WG2 NR ad Hoc; R2-1706971; Qingdao, China (Jun. 2017). (5 pages).

3GPP TR 38.801 V14.0.0 (Mar. 2017), 3rd Generation Partnership Project; Technical Specification Group Radio Access Network; Study on new radio access technology: Radio access architecture and interfaces; (Release 14) (Mar. 2017). (91 pages).

3GPP TS 36.331 v14.4.0 (Sep. 2017); 3rd Generation Partnership Project; Technical Specification Group Radio Access Network; Evolved Universal Terrestrial Radio Access (E-UTRA); Radio Resource Control (RRC); Protocol specification (Release 14); Sep. 2017. (753 pages).

3GPP TS 38.331 V0.1.0 (Oct. 2017); 3rd Generation Partnership Project; Technical Specification Group Radio Access Network; NR; Radio Resource Control (RRC); Protocol specification (Release 15); Oct. 2017. (42 pages).

International Search Report and Written Opinion dated Nov. 21, 2018 issued in International Application No. PCT/EP2018/077578. (16 pages).

OPPO, "Discussion on ANR Functionality for eLTE", 3GPP TSG-RAN WG2#99bis; R2-1710183; Prague, Czech Republic; Oct. 2017. (3 pages).

ZTE, "Discussion on gNB-eNB interface setup", 3GPP TSG-RAN WG3 NR AdHoc; R3-172370; Qingdao, China; Jun. 2017. (2 pages).

OPPO, "Discussion on EPC and 5GC Selection during Intra-LTE Handover with CN Type Change", 3GPP TSG-RAN WG2#101; R2-1801781; Athens, Greece; Mar. 2018. (3 pages).

Nokia et al., "Cell global identity and ANR functionality", 3GPP TSG-RAN WG2 NR Adhoc #2, R2-1706455, Qingdao, China, Jun. 27-29, 2017 (7 pages).

Huawei et al., "Discussion on detailed indications in MIB", 3GPP TSG-RAN WG#99 Meeting, R2-1708064, Berlin, Germany Aug. 21-25, 2017 (3 pages).

Ericsson, "SA and NSA indication in CGI reporting", 3GPP TST-RAN WG2 NR-Ah#1801, R2-1801309, Vancouver, Canada, Jan. 22-26, 2018 (4 pages).

Deutsche Telekcom AG, "5G Architecture Options—Full Set," 3GPP RAN #72, RP-161266 Jun. 14, 2016 (11 pages).

Vivo, "Identification NSA mode during initial access", 3GPP TSG RAN WG1 NR Ad-Hoc#2, R1-1710379, Qingdao, P. R. China, Jun. 27-30, 2017 (3 pages).

Vivo, "Identification NSA mode during initial access", 3GPP TSG RAN WG1 Meeting #88bis, R1-1704487, Spokane, USA, Apr. 3-7, 2017 (3 pages).

* cited by examiner

1700 transmit network node type information, wherein the network node type information indicates at least one of: i) that the network node is a Stand-Alone (SA) network node and ii) that the network node is a Non-Stand-Alone (NSA) network node    1702

REPORT NSA/SA NR INDICATOR

CROSS-REFERENCE TO RELATED APPLICATIONS

This application is a continuation of U.S. patent application Ser. No. 16/479,486, having a section 371 date of Jul. 19, 2019 (published as US 2019-0357095), which is the National Stage Entry of International Patent Application No. PCT/EP2018/077572, filed on Oct. 10, 2018, which claims priority to U.S. provisional patent application No. 62/570,341, filed Oct. 10, 2017. The above identified applications and publication are incorporated by this reference.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Standardization of 5G, including New Radio (NR) and 5th Generation Core Network (5GCN), is ongoing in 3GPP. FIG. 1 depicts various ways to deploy 5G network with or without interworking with existing LTE and EPC. Some of the various ways to deploy 5G network are depicted as "options" in FIG. 1.

A method of deploying the 5G network is referred to as "option 3" and called EN-DC (E-UTRAN-NR Dual Connectivity), according to some embodiments. In option 3, Dual Connectivity between NR and LTE is applied where LTE is a master node and NR is a secondary node. The RAN node (gNB) supporting NR, may not have a control plane connection to core network (e.g., EPC), and instead rely on the LTE as master node (MeNB). This may also called a "Non-stand-alone NR" and there is no 5GCN in this deployment. In some non-exemplary embodiments, the functionality of an NR cell may be limited to be used for connected mode UEs as a booster and/or diversity leg, and a UE may not camp on these NR cells in option 3.

With the introduction of 5GCN, other options, as shown in FIG. 1, may also be valid. For example, option 2 may support stand-alone NR deployment where a gNB is connected to 5GCN. Similarly, LTE may also be connected to 5GCN as shown in option 5. In option 2 and option 5, both NR and LTE are seen as part of the NG-RAN which connects to 5GCN.

In some embodiments, option 4 and option 7 may be other variants of dual connectivity between LTE and NR which will be standardized as part of NG-RAN connected to 5GCN, which are called MR-DC (Multi-Radio Dual Connectivity).

In actual deployment, it is possible to support multiple options in parallel in the same network. For example, there can be eNB base station supporting options 3, 5 and 7 in a network and a NR base station supporting options 2 and 4 in the same network. In combination with dual connectivity solutions between LTE and NR, it is also possible to support CA (Carrier Aggregation) in each cell group (i.e. MCG and SCG) and dual connectivity between nodes on same RAT (e.g. NR-NR DC).

FIG. 2 illustrates various interfaces used in the network corresponding to the different options described above. The various interfaces depicted in FIG. 2 correspond to FIGS. 4.3.1.1-1 and FIGS. 4.3.2.2-1 of 3GPP TS37.340.

As shown in FIG. 2, an X2 interface is used to support EN-DC between an LTE MeNB and a NR SgNB. MR-DC for 5GCN is however supported using the Xn protocol between LTE or NR MN node and LTE or NR SN node. In addition to Dual Connectivity, the X2 and Xn may also be used to support handovers, where the X2 may be used for intra-LTE handovers for UEs connected to EPC core network (CN), and the Xn may be used for handover within and between LTE and NR for UEs connected to 5GCN. The S1 and NG interfaces are used for intra-system handover between EPC and 5GCN.

SUMMARY

There currently exist certain challenges. A mixture of different deployment options in the same network is inevitable and this mixture may cause problems. One example is the coexistence of network nodes only supporting Non-Stand-Alone (NSA) NR and network nodes supporting Stand-Alone (SA) NR in the same network. Even if the nodes could support both SA and NSA, the operator may decide to configure some NR cells to operate in SA mode and/or only NSA mode (e.g. for capacity boosting of LTE cells, depending on the distribution of devices supporting SA and NSA).

In addition to the different deployments, there will also be different terminal capabilities such as, but not limited to: (i) LTE capable and NR NSA capable (via in EN-DC); (ii) LTE capable and NR SA capable only; and (iii) LTE capable, NR SA capable and NSA capable (via ED-DC).

From a network perspective, NR SA cells and NR NSA cells support different functionalities. In some embodiments, the NR SA cell may support the following functionalities: (i) an inactive/idle UE can camp on it; (ii) a connected mode UE in NR can be handed over to it; (iii) a connected mode UE in NR can be ordered to setup NR DC and/or CA; (iv) a connected mode UE in LTE can be handed over to it; and (v) a connected mode UE in LTE can be ordered to setup inter-RAT DC (if same CN). In some embodiments, the NR NSA cell may support the following functionalities: (i) a connected mode UE in NR can be ordered to setup NR DC and/or CA; and (ii) a connected mode UE in LTE can be ordered to setup inter-RAT DC (if the same CN). In some embodiments, the NR NSA cell may not support functions for idle/inactive UEs.

As different NR cells may have various functionalities, UE capabilities may be equally as diverse. Accordingly, due to the various functionalities of the different NR cells and various UE capabilities, conventional methods of 5G network deployment may lead to frequent error cases.

For example, a scenario in which a problem may arise in conventional methods of 5G network deployment is when a UE connected to an LTE-EPC eNodeB sends a measurement report with an NR cell-A and the serving eNodeB wants to perform an inter-RAT handover and/or release and redirect to that NR cell. If the target NR cell is NSA, this will lead to errors.

Another scenario in which a problem may arise in conventional methods of 5G network deployment is when a UE connected to an LTE-EPC eNodeB sends a measurement report with an NR cell-A and the serving eNodeB wants to perform EN-DC. If the NR cell is an SA cell that is not supported, this will also lead to errors.

Yet another scenario in which a problem may arise in conventional methods of 5G network deployment is when a UE connected to an NR gNodeB sends a measurement report with an NR cell-A and the serving gNodeB wants to perform a handover. If that NR cell is a NSA cell that is not supported, this also could lead to errors.

FIG. 3 depicts an exemplary scenario combining option 1, option 2, and option 3 of the options described above in FIG. 1. As shown in FIG. 3, an NR capable UE is camped on the SA NR cell. The mobility handling functionality in the NR cell is expected to aid the UE with a mobility action if it is in poor coverage. This is normally achieved with help of UE measurements configured by the network. In the example shown in FIG. 3, the UE reports the neighbor NR cell as a better target and the source NR may initiate a handover. However, it is not possible to execute a handover in this scenario because the target is a NSA only NR cell with no connection to 5GCN. This handover should be avoided and other actions, such as IRAT mobility to LTE if out of NR coverage, should be considered for this UE.

The above mentioned problems are mainly related to actions from the serving node towards the UE. However, there may also be problems in terms of inter-node actions the serving node can take. For example, it may not be possible for the serving node to setup X2 connectivity with an NR node handling an SA cell. As another example, it may not be possible for the serving node to setup Xn connectivity with an NR node handling an NSA cell.

With existing solutions for NR measurement reporting based on Physical Cell Identity (PCI), there does not exist a proper way for the serving node (either an NR node or an LTE node or a node from any RAT capable of performing inter-RAT mobility and/or DC setup) to know whether the target NR cell supports NSA NR, SA NR or both. This inability of the serving node to know whether the target NR cell supports NSA NR, SA NR or both may lead to problems. For example, the serving node may request the UE to perform actions to cells that do not support the intended functionality and/or the serving node may make the network completely blind as to what kind of actions can be taken in terms of inter-node signaling. For example, the network would not be able to determine whether to setup an X2 interface, to setup of an Xn interface, or determine whether there are not any possible inter-node setups available, etc.

Certain aspects of the present disclosure and their embodiments may provide solutions to these or other challenges.

The present disclosure is directed, in one aspect, to a UE reporting network node type information to a serving node, where the network node type information indicates at least one of i) that the neighbor network node is a Stand-Alone (SA) network node and ii) that the neighbor network node is a Non-Stand-Alone (NSA) network node.

In some embodiments, the UE may receive information indicating support for NSA and/or SA NR from a neighbor cell broadcast channel, and subsequently report this information to the serving cell. In some embodiments, the UE may be a NR cell UE. The network node responsible for the serving cell can then use this information to determine whether it should trigger a handover to the neighbor cell and/or whether it should setup an Xn (or X2) interface with the neighbor node.

In some embodiments, the receiving and reporting of the SA/NSA information by the NR cell UE may be configured by the network.

In some embodiments, an enhanced cell global identifier (CGI) reporting functionality allows a network to provide a UE with an NR cell identifier, e.g. a physical cell identifier (PCI). The UE may acquire system information associated with the NR cell identifier (by any system information acquisition method e.g. broadcasted or on demand) based on the NR cell identifier and determine whether the NR cell is an SA, NSA, or both SA/NSA. Once the UE determines whether the NR cell is an SA, NSA or both SA/NSA, the UE includes identification information identifying whether the NR cell is an SA, NSA, or both SA/NSA in a measurement report and sends the measurement report to the serving node.

In some embodiments, based on the reported information from the UE about reported NR cell(s) and identified SA/NSA support, the serving network node may decide which type of interface it can setup with the neighbor NR node (e.g. X2, Xn, etc.) and/or what kind of action towards the UE can be taken i.e. handovers, CA/DC setup (SCG addition), release and redirect, etc. In some embodiments, the NR neighbor node can also transmit a list of NR cells with an indication for each NR cell regarding whether each NR cell supports SA, NSA or both (SA and NSA).

The present disclosure introduces new information in existing UE measurements on NR. In some embodiments, the new information comprises the inclusion of information relating to the ability of the UE to camp on the neighbor NR cell or not. This new information is essential for the mobility/ANR functionality in the network to assist RAN (eNB/gNB) with optimal decision making in various scenarios.

Certain embodiments disclosed herein may provide one or more technical advantages including: (i) improved ANR functionality; (ii) improved mobility handling and reduced handover failure; (iii) end user performance; and (iv) simplified network management.

Specifically, the improved ANR functionality aims to provide neighbor cell relation information required in the eNB/gNB to assist in different RAN decisions and actions, such as coverage triggered mobility, dual connectivity setup/modification, among others. The identification of whether an NR neighbor cell is stand-alone or non-stand-alone is part of the required information for the eNB/gNB to initiate appropriate actions in different scenarios.

Regarding the improved mobility handling and reduced handover failure, the current disclosure allows the avoidance of handover initiation towards non-stand-alone NR neighbors which would result into failure.

Regarding the improved end user performance, the current disclosure allows the avoidance of probable UE performance degradation due to failed handover. Moreover, the knowledge about neighbor NR cell (NSA/SA indicator), helps an eNB/gNB make optimized RAN decisions and actions further based on the UE capabilities and network characteristics.

Regarding the simplified network management, manual planning of neighboring cell relations may be reduced.

There are, proposed herein, various embodiments which address one or more of the issues disclosed herein.

In some embodiments, a method implemented in a wireless device is provided. The method includes acquiring network node type information transmitted by a neighbor network node, wherein the network node type information indicates at least one of: i) that the neighbor network node is a Stand-Alone (SA) network node and ii) that the neighbor network node is a Non-Stand-Alone (NSA) network node; and transmitting to a serving network node a report comprising identification information identifying the neighbor network node and network node type information indicating at least one of: i) that the identified neighbor network node is an SA network node and ii) that the identified neighbor network node is a NSA network node.

In some embodiments, a method performed by a serving network node for establishing an interface with a neighbor network node is provided. The method includes receiving a report transmitted by a wireless device, wherein the report comprises identification information identifying the neighbor network node and network node type information indicating at least one of: i) that the identified neighbor network node is an SA network node and ii) that the identified neighbor network node is a NSA network node; and determining, based on the report, a type of interface to establish between the serving network node and the neighbor network node.

In some embodiments, a method performed by a network node is provided. The method includes transmitting network node type information, wherein the network node type information indicates at least one of: i) that the network node is a Stand-Alone (SA) network node and ii) that the network node is a Non-Stand-Alone (NSA) network node.

In an aspect, a method performed by a wireless device is provided. The method includes acquiring network support information associated with a neighbor cell, wherein the network support information indicates that the neighbor cell supports a Stand-Alone (SA) mode of operation and/or a Non-Stand-Alone (NSA) mode of operation. The method includes transmitting to a serving network node a report comprising identification information associated with the neighbour cell and the network support information indicating that the neighbor cell supports a SA mode of operation and/or a NSA mode of operation.

In some embodiments, the network support information comprises an SA/NSA indicator. In some embodiments, the network support information comprises at least one of: a Cell Global Identity (CGI), a Tracking Area Code, a Core Network (CN) identifier, and a Public Land Mobile Network (PLMN) identifier.

In some embodiments, the method includes deriving the SA mode of operation and/or NSA mode of operation supported by the neighbor cell based on the at least one of: the CGI, the Tracking Area Code, the CN identifier, and the PLMN identifier.

In some embodiments, the method includes receiving from a network a cell identifier for identifying the neighbor cell before acquiring the network support information; and using the cell identifier to acquire the network support information.

In some embodiments, the step of acquiring the network support information comprises: receiving system information broadcast associated with the cell identifier, wherein the system information broadcast comprises the network support information; and acquiring the network support information from the received system information.

In some embodiments, the step of acquiring the network support information comprises: transmitting a request to a neighbor network node providing the neighbor cell for system information; receiving the requested system information from the neighbor network node, wherein the system information comprises the network support information; and acquiring the network support information from the received system information.

In some embodiments, the method includes after acquiring the network support information, determining, based on the acquired network support information, whether the neighbor cell supports a SA mode of operation and/or a NSA mode of operation.

In another aspect, a method performed by a serving network node for establishing an interface with a neighbor network node providing a neighbor cell is provided. The method includes receiving a report transmitted by a wireless device, wherein the report comprises identification information associated with the neighbor cell and network support information indicating that the neighbor cell supports a Stand-Alone (SA) mode of operation and/or a Non-Stand-Alone (NSA) mode of operation. The method includes determining, based on the report, a type of interface to establish between the serving network node and the neighbor network node.

In some embodiments, the method includes storing the identification information associated with the neighbor cell and network support information. In some embodiments, the method includes determining whether the neighbor cell supports a SA mode of operation and/or a NSA mode of operation based on the report.

In some embodiments, the serving network node is an eNodeB. In such embodiments, the method includes based on a determination that the neighbor cell supports a NSA mode of operation, determining whether the wireless device supports EUTRAN-New Radio Dual Connectivity (EN-DC); and based on a determination that the wireless device supports EUTRAN-New Radio Dual Connectivity (EN-DC), configuring dual connectivity with the neighbor cell.

In some embodiments, the serving network node is an eNodeB. In such embodiments, the method includes based on a determination that the neighbor cell supports a SA mode of operation and a NSA mode of operation, determining whether the wireless device support both SA and NSA modes of operation; and based on a determination that the wireless device supports both SA and NSA modes of operation, initiating at least one of: (i) an Inter-Radio Access Technology (IRAT) handover to the neighbor cell and (ii) a configuration of EUTRAN-New Radio Dual Connectivity (EN-DC) with the neighbor cell.

In some embodiments, the serving network node is an eNodeB. In such embodiments, the method includes based on a determination that the neighbor cell supports a SA mode of operation, determining whether the wireless device supports a SA mode of operation; and based on a determination that the wireless device supports a SA mode of operation, initiating an Inter-Radio Access Technology (IRAT) handover to the neighbor cell.

In some embodiments, the serving network node is a gNodeB in a SA mode of operation. In such embodiments, the method includes based on a determination that the neighbor cell only supports a NSA mode of operation, deciding not to initiate a handover to the identified neighbor network node.

In some embodiments, the serving network node is a gNodeB in a SA mode of operation. In such embodiments, the method includes based on a determination that the neighbor cell supports a SA mode of operation, initiating a handover to the neighbor cell.

In some embodiments, the serving network node is a gNodeB in a NSA mode of operation. In such embodiments, the method includes based on a determination that the neighbor cell only supports NSA mode of operation, triggering a secondary network node modification procedure.

In some embodiments, the serving network node is a gNodeB in a NSA mode of operation. In such embodiments, the method includes based on a determination that the neighbor cell supports both SA and NSA modes of operation, triggering a secondary network node modification procedure.

In some embodiments, the determined type of interface to establish between the serving network node and the neighbor network node is an Xn connection interface. In some embodiments, the serving network node is an eNodeB connected to a 5th Generation Core (5GC) network and the neighbor network node is gNodeB in a SA mode of operation and connected to the 5GC network.

In another aspect, a method performed by a network node is provided. The method includes transmitting network support information associated with a neighbor cell, wherein the network support information indicates that the neighbor cell supports a Stand-Alone (SA) mode of operation and/or a Non-Stand-Alone (NSA) mode of operation.

In some embodiments, the network support information comprises an SA/NSA indicator. In some embodiments, the network support information comprises at least one or more Core Network (CN) identifiers and Public Land Mobile Network (PLMN) identifiers.

In some embodiments, the step of transmitting the network support information comprises broadcasting the network support information.

BRIEF DESCRIPTION OF THE DRAWINGS

The accompanying drawings, which are incorporated herein and form part of the specification, illustrate various embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
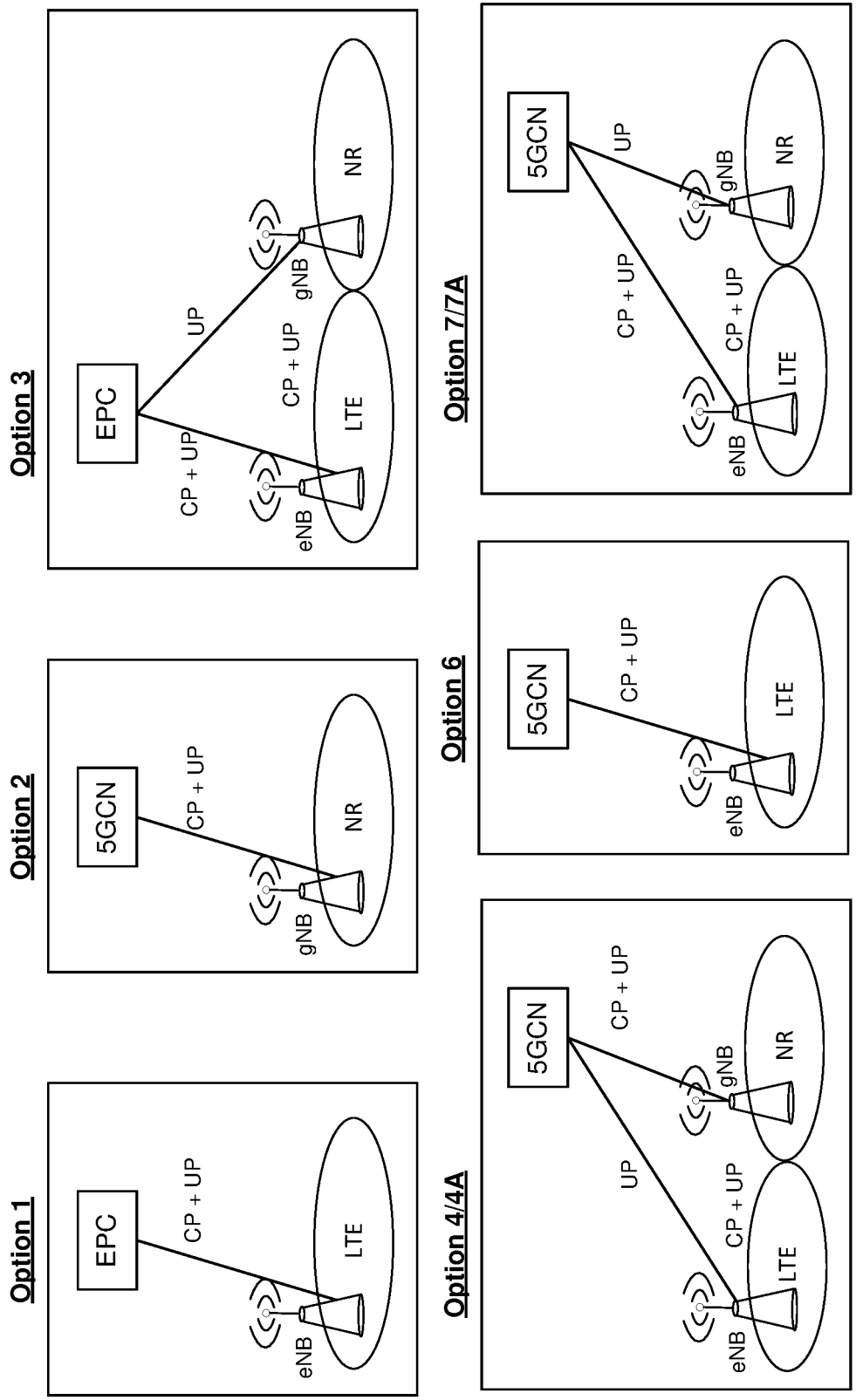
FIG. 1 illustrates various ways to deploy a network.
Figure 2:
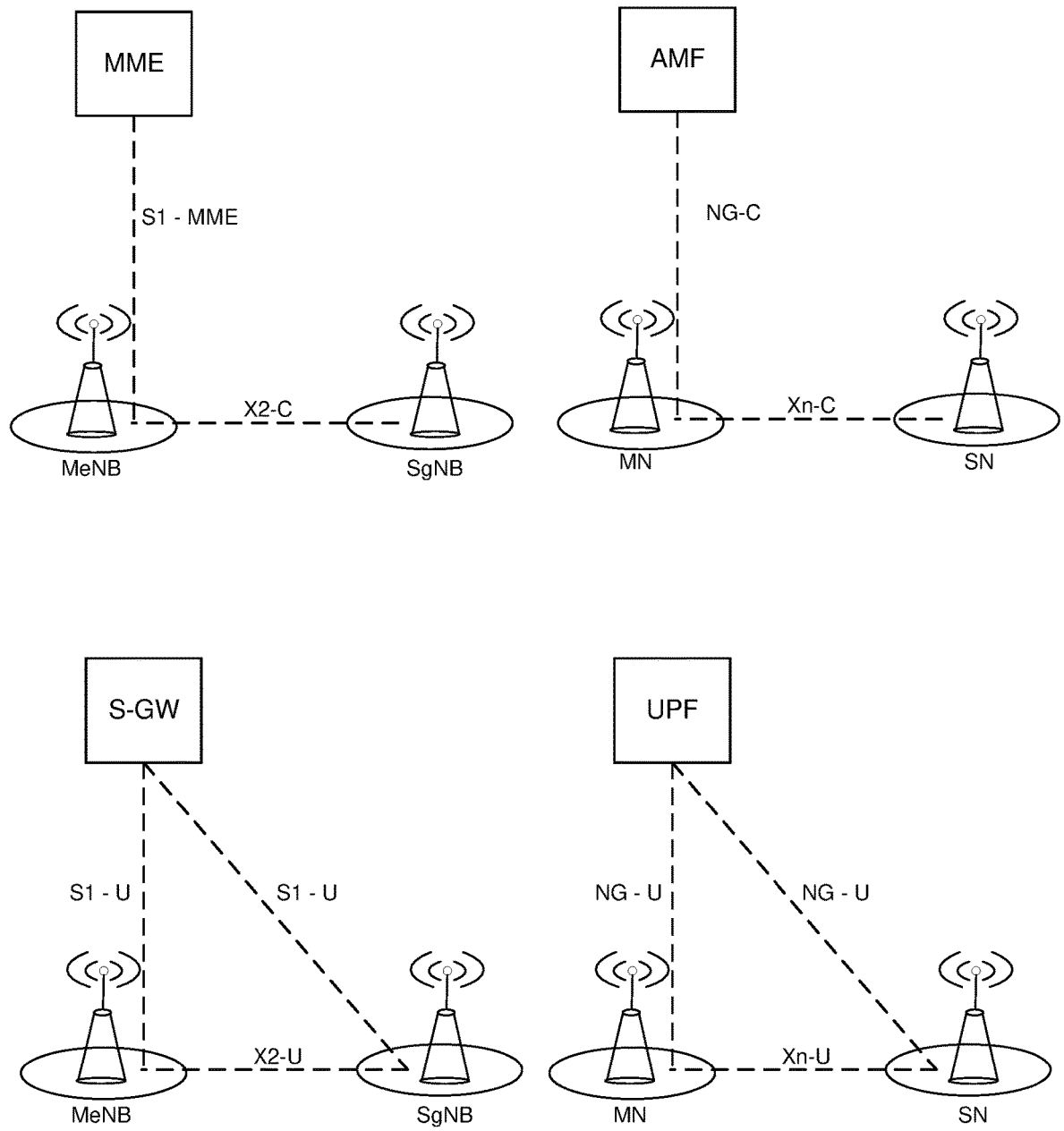
FIG. 2 illustrates various interfaces used in a network.
Figure 3:
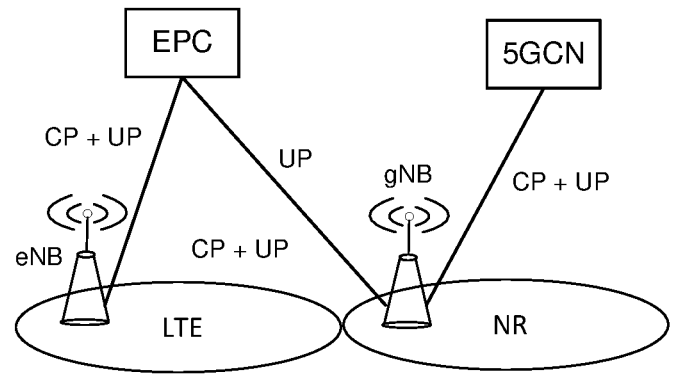
FIG. 3 depicts an exemplary scenario according to one embodiment.
Figure 3:
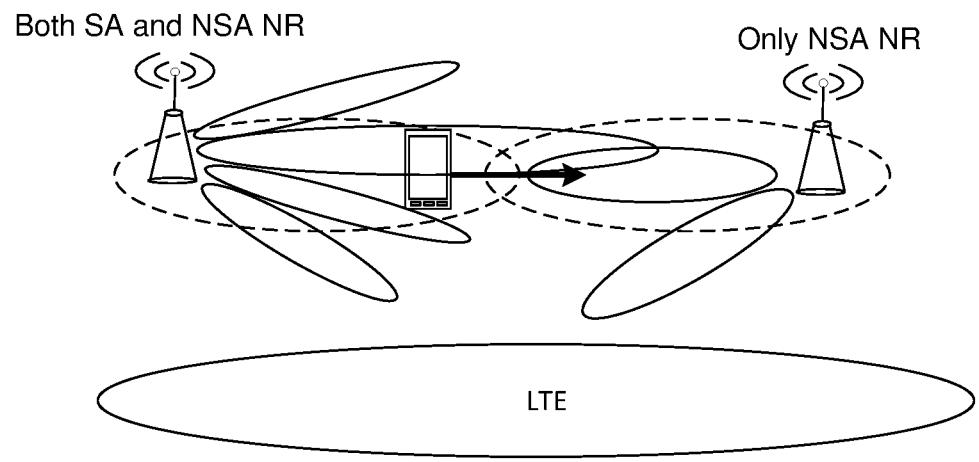
Figure 4:
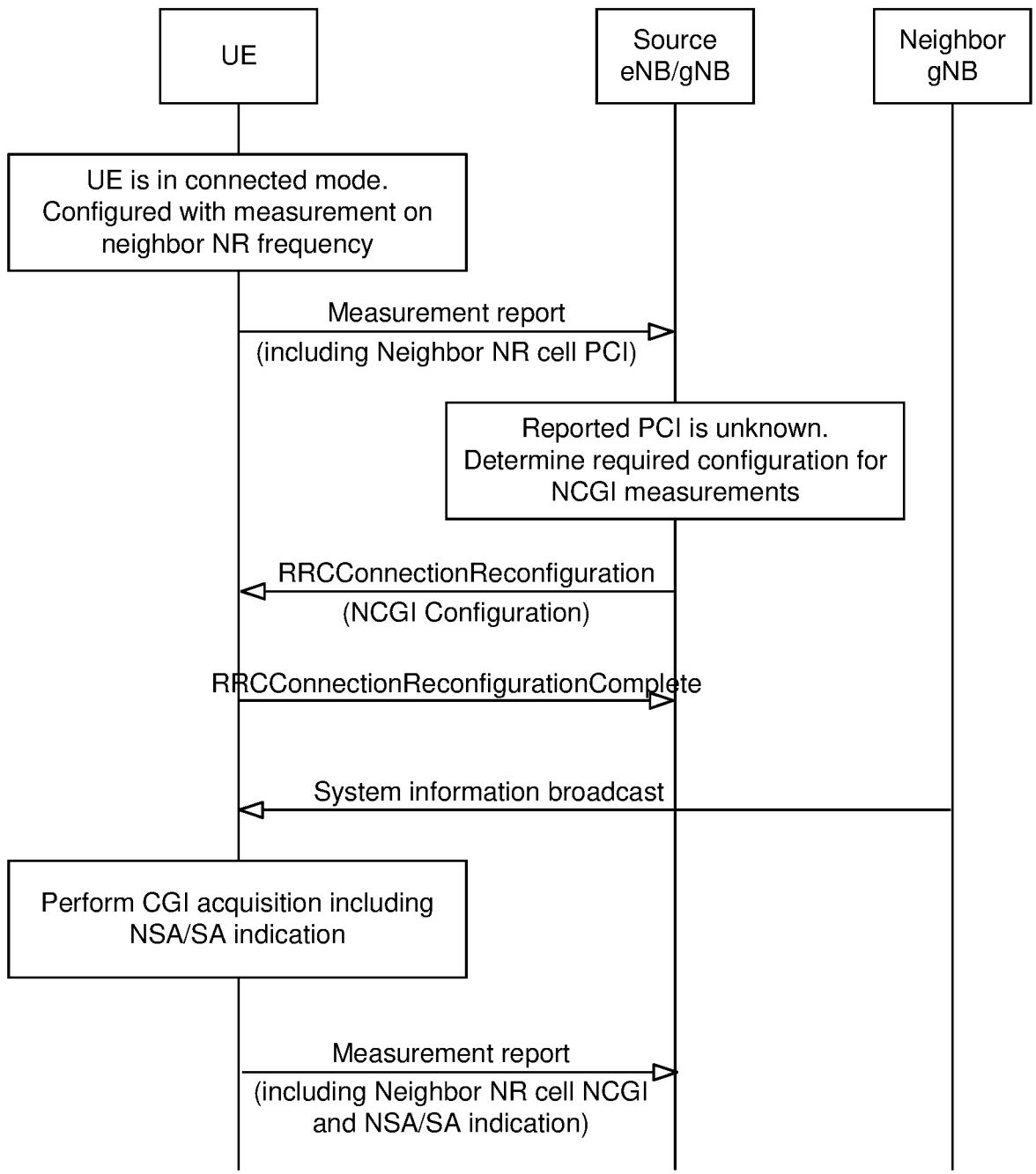
FIG. 4 illustrates a message flow diagram according to one embodiment.

FIG. 4 illustrates a message flow diagram illustrating signalling for NCGI (NR Cell Global Identity) measurement according to some embodiments.

CGI reporting is part of ANR functionality, where the UE is requested to read and report neighbor cells system information (including global cell identity) in order to assist a source eNB/gNB to collect and store neighbor cell relation information. In some embodiments, CGI measurement may be requested when the UE has reported an unknown PCI (i.e. an unknown neighbor cell). The UE may transmit a measurement report to the source eNB/gNB including a neighbor NR cell PCI (Physical Cell Identity). The PCI information may be included in all UE measurement reports, and the UE measurement reports may be initiated for different purposes. When the source eNB/gNB receives measurement reports containing required information about a neighbor cell, the information may be stored and used to setup an X2 or Xn connection between the source eNB/gNB and the neighbour gNB. In some embodiments, the setup X2 or Xn connection may be used later for several different procedures, such as handover, dual connectivity setup, etc.

Further referring to FIG. 4, the message flow diagram illustrating NCGI acquisition signalling may be valid for the following several different embodiments described below.

The UE may be configured with an NR measurement according to some embodiments. In some embodiments, the NR measurement may be an IRAT if the UE is connected to a source eNB. In some embodiments, the NR measurement may be an intra-NR measurement if the UE is connected to a source gNB. In some embodiments, the UE connected to a gNB may be in a NSA mode or an SA mode. In the context of the present disclosure, a UE in NSA mode means that the UE is configured with EN-DC. In the context of the present disclosure, a UE in SA mode means that the UE is camped in an SA NR cell.

When the UE reports a neighbor NR cell's PCI which is not known in the serving eNB/gNB, an NCGI measurement is requested by the network. In some embodiments, the NCGI measurement may indicate whether the neighbor cell is an SA, NSA, or both SA/NSA. In some embodiments, the NCGI measurement report is expected to indicate whether the neighbor NR cell is limited only to NSA, i.e. the cell cannot be camped on. This could be based on any of the following embodiments:

In some embodiments, the NR cell broadcasts a SA/NSA indicator (in some System Information Broadcast) explicitly. In some embodiments, the UE may determine based on an implicit indication from the neighbor NR cell in certain System Broadcast information. In this embodiment, the UE may indicate NSA cell implicitly based on the absence of certain System Broadcast information (NSA only cells are expected to have a limited broadcast system information). For example, NSA cells only broadcast MIBs and SIB-1 (or up to SIB-x where x<N where N is the highest SIB value). In some embodiments, some CN identifiers/PLMN identifiers broadcasted in system information for the SA and/or NSA cells could be used by UE to determine if the cells can be camped on or not.

Based on the information included in the measurement report, as part of ANR functionality, the source eNB/gNB may store the supported modes in neighboring NR cells, according to some embodiments. In some embodiments, an NR cell which cannot be camped on supports only NSA (EN-DC) operation. In some embodiments, an NR cell which can be camped on supports SA operation. In this embodiment, an SA NR cell may or may not support NSA operation. It is not possible to distinguish whether the SA NR cell supports both SA and NSA or just SA based only on the received measurement report. In some embodiments, the source eNB/gNB may take additional steps in order to determine whether the SA NR cell supports both SA and NSA or just SA. For example, a source eNB may take the additional step of initiating setup of an X2 interface to the SA NR cell. In some embodiments, a gNB hosting the SN NR cell which supports just SA may not support an X2 interface. Accordingly, a failure to setup the X2 interface between the source eNB and the gNB may provide an indication to the source eNB that the gNB hosting the SA NR cell supports just SA. In some embodiments, the source eNB may successfully setup an X2 interface with the gNB hosting the SA NR cell. In this embodiment, the gNB hosting the SA NR cell may support both SA and NSA. Upon successful setup of the X2 interface, further information may be exchanged between the source eNB and the gNB to determine whether the source eNB and/or the gNB supports EN-DC.

Different actions may be expected depending on the serving node (whether the serving node is an eNB or gNB), the neighbor NR cell support mode (NSA, SA or both) and the UE capability (NSA and/or SA).

In some embodiments, the UE may be connected to an eNB and configured with IRAT NR measurements. When UE reports a suitable NR neighbor:

(1) If neighbor NR cell supports NSA only, and if the UE supports EN-DC, the eNB may decide to configure dual connectivity (e.g. SgNB addition procedure). In case the UE has already been configured with EN-DC towards another NR cell, an SgNB modification procedure may be triggered. (these procedures are described in 3GPP TS37.340)

(2) If neighbor NR cell supports both NSA and SA and the UE supports both NSA and SA, the eNB may choose between IRAT handover and EN-DC configuration based on different factors such as frequency band/coverage, capacity/load, service, among others.

(3) If neighbor NR cell supports only SA NR, and the UE also supports SA mode, the eNB may decide to initiate IRAT mobility. If the UE does not support SA, the neighbor NR cell may not be used for this UE.

Figure 5:
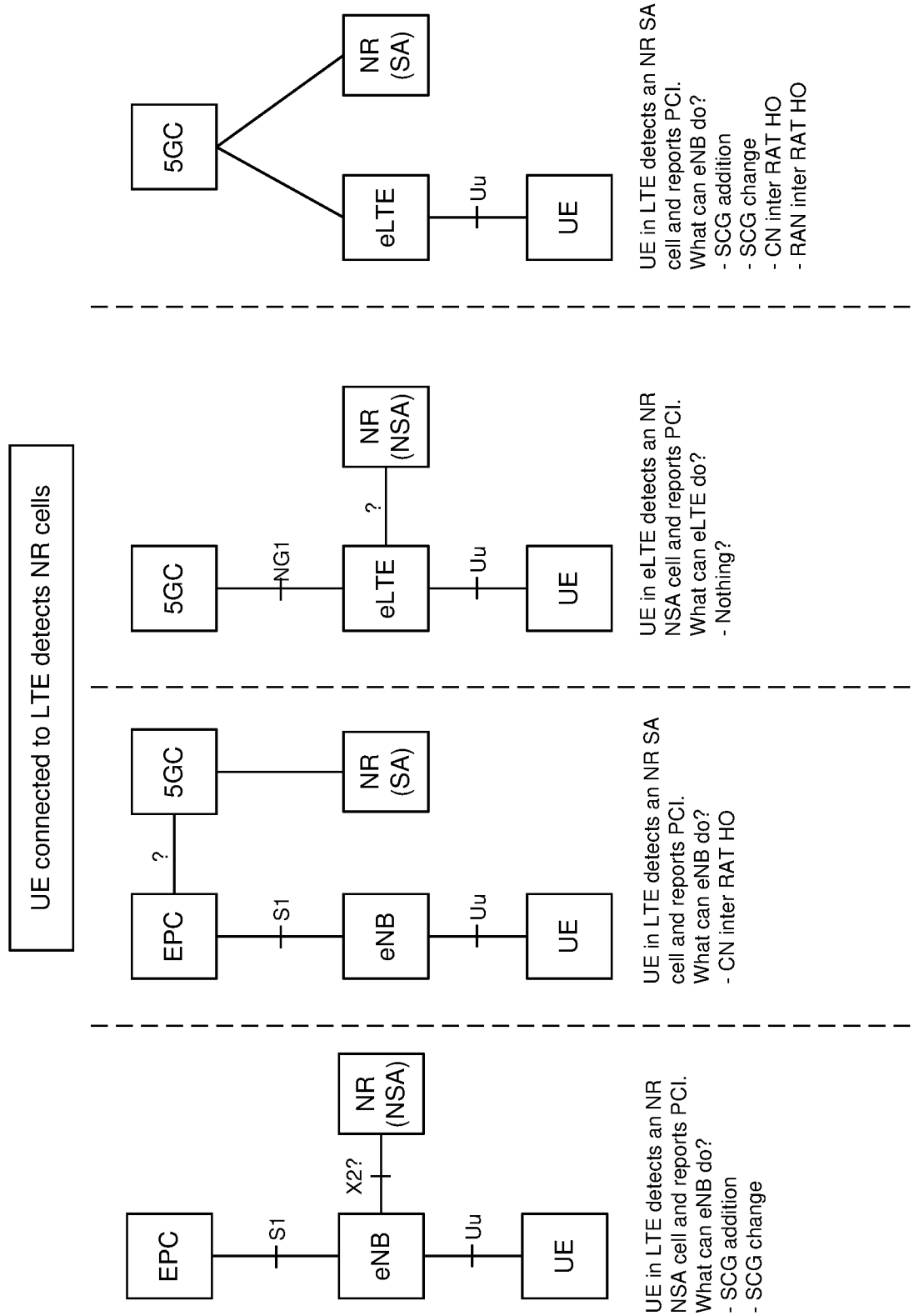
FIG. 5 illustrates a summary of different actions according to some embodiments.

FIG. 5 illustrates a non-limiting summary of some different actions depending on the serving node (whether the serving node is an eNB or gNB), the neighbor NR cell support mode (NSA, SA or both) and the UE capability (NSA and/or SA) including some the actions described above.

In some embodiments, the UE may be connected to a gNB in SA mode and the UE may be configured with Intra NR measurements. Accordingly, when the UE reports an NR neighbor cell:

(1) If the neighbor NR cell is NSA only, a handover should not be initiated to that target neighbor NR cell. In some embodiments, the UE may be asked to continue with NR measurements or requested to perform IRAT LTE measurements, or it may be released with redirection to a preferred frequency/RAT. In some embodiments, if both the UE and the gNB provide support, DC or CA between the gNB and neighbor NR cells may also be an option.

(2) If neighbor NR cell supports SA, the gNB may initiate intra-NR handover if desired. Other options such as DC or CA may be also valid.

In some embodiments, the UE may be connected to a gNB in NSA mode (EN-DC configuration) and the UE may be configured with Intra NR measurements. Accordingly, when the UE reports an NR neighbor cell:

(1) If neighbor NR cell is NSA only, an SgNB modification procedure may be triggered.

(2) If neighbor NR cell supports both NSA and SA, an SgNB modification procedure may be triggered.

(3) If neighbor NR cell supports only SA NR, an SgNB modification procedure may not be triggered.

In some embodiments, the UE may include the indication of SA or NSA reports by different kinds of configuration. The network may configure the UE with a field in the NR measurement object indicating that detected NR cells in that particular measurement object, when reported, should include the SA/NSA indication.

In some embodiments, the SA/NSA indication may be implicitly derived by the UE based on any other indication, implicit or explicit, that is associated to the NR neighbor cell. For example, that is a barring information that is also intended to be detected by an idle/inactive UE to know whether that NR cell can be camped or not. In another example, the UE may detect that a cell is not an SA cell by the absence of specific system information blocks, e.g., NSA NR Cells can only have MIB and/or SIB1 and/or SIB2 or no SIBs.

In some embodiments, the SA/NSA indication may be implicitly derived by the UE and/or by the network based on bits of other network identifiers such as CGI, Tracking area codes, PLMN identifiers, PCI, etc.

Additionally, there may be network related embodiments as described in the following.

In some embodiments, one possible network related embodiment may be that SA/NSA NR information could be exchanged via Xn or X2. This, however, may not be possible in all cases. For example, if the NR node only supports NSA NR it is only required to support X2, while if the NR node only supports SA NR it is only required to support Xn. This means that the NR node has no common interface to use. Accordingly, this network related embodiment would be possible in scenarios where the nodes support the same interface. In some embodiments, new information elements may be added to this interface to signal support for NSA or SA NR modes.

In some embodiments, another possible network related embodiment may be to rely on handover statistics, i.e. to ignore specific targets from handover after no success rate over time. This network related embodiment may impact both network and UE performance negatively.

In some embodiments, manual configuration may not be a practical and preferred option in the real field.

In some embodiments, Handover (HO) restriction list may be configured by core network, which is an existing network related embodiment. Assigning different tracking areas for NSA and SA, however, may not provide a practical option in reality. For example, assigning different tracking areas for NSA and SA cells requires update of the tracking area planning at every RAN upgrade.

In some embodiments, the serving node may perform one of the following actions and/or a combination of these based on the reported NSA/SA information per NR cell:

(1) If the reported NR cell is an NR SA cell (i.e. connected to 5GC), the serving node may determine what kind of inter-node interface that should be setup. For example, (i) if the serving node is an eNodeB connected to NGC, it may setup an Xn connection (if same CN node), and (ii) if the serving node is an gNodeB connected to NGC it can setup an Xn connection (if same CN node).

(2) Depending on UE capabilities, the network may backlist some SA and/or NSA cells for a given UE. For example, (i) if the reported NR cell reported is an NR NSA cell (i.e. connected to 5GC) and the serving node is interested to configure a particular measurement object for inter-RAT mobility purposes, the reported cells may be black-listed for that measurement object, and (ii) if the reported NR cell reported is an NR NSA cell (i.e. connected to 5GC) and the UE is not EN-DC capable, the cells for that particular UE may be blacklisted.

(3) Depending on UE capabilities and/or a specific interest the network may have (DC, IRAT, etc.), the network may whitelist some SA and/or NSA cells for a given UE.

Figure 6:
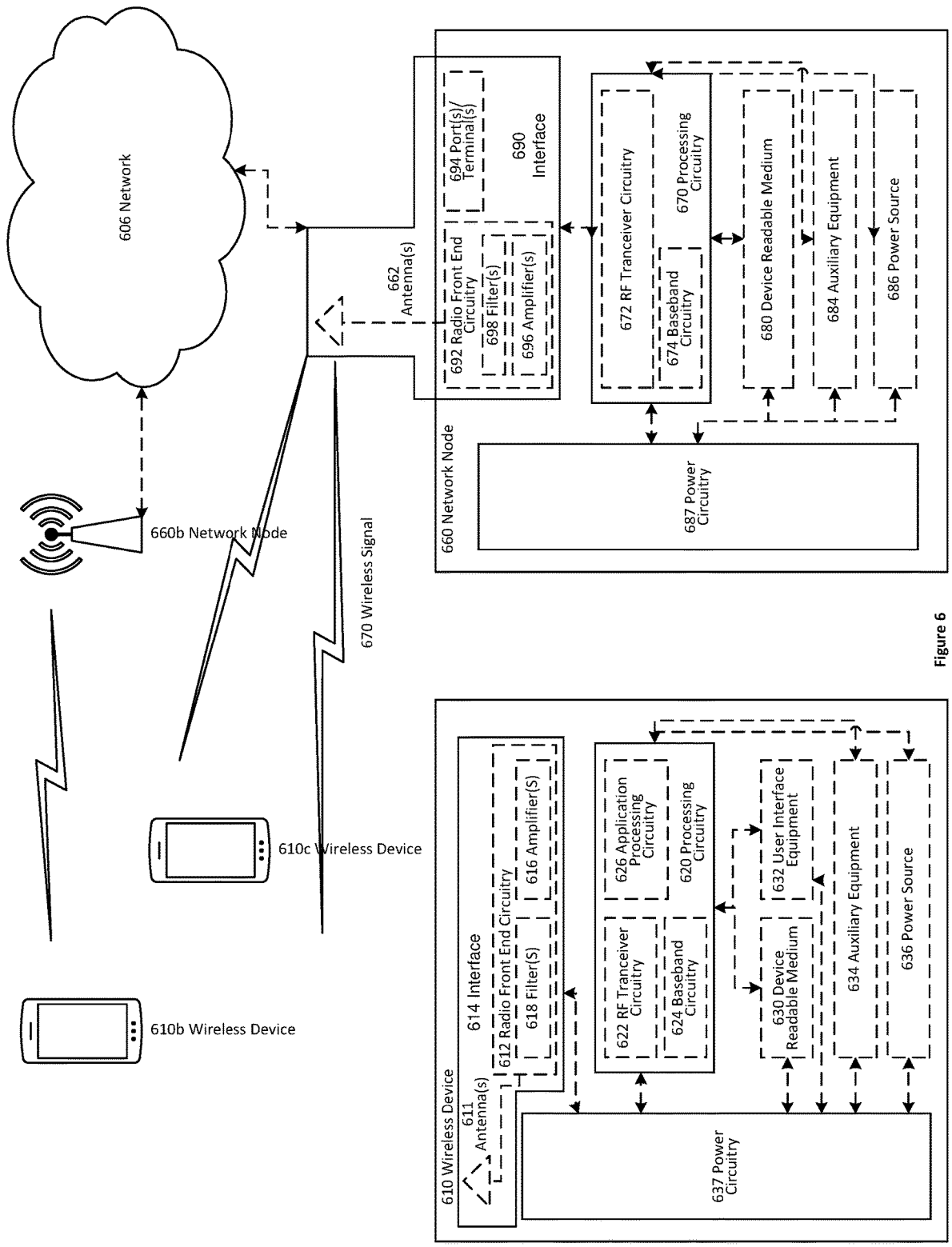
FIG. 6, which shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
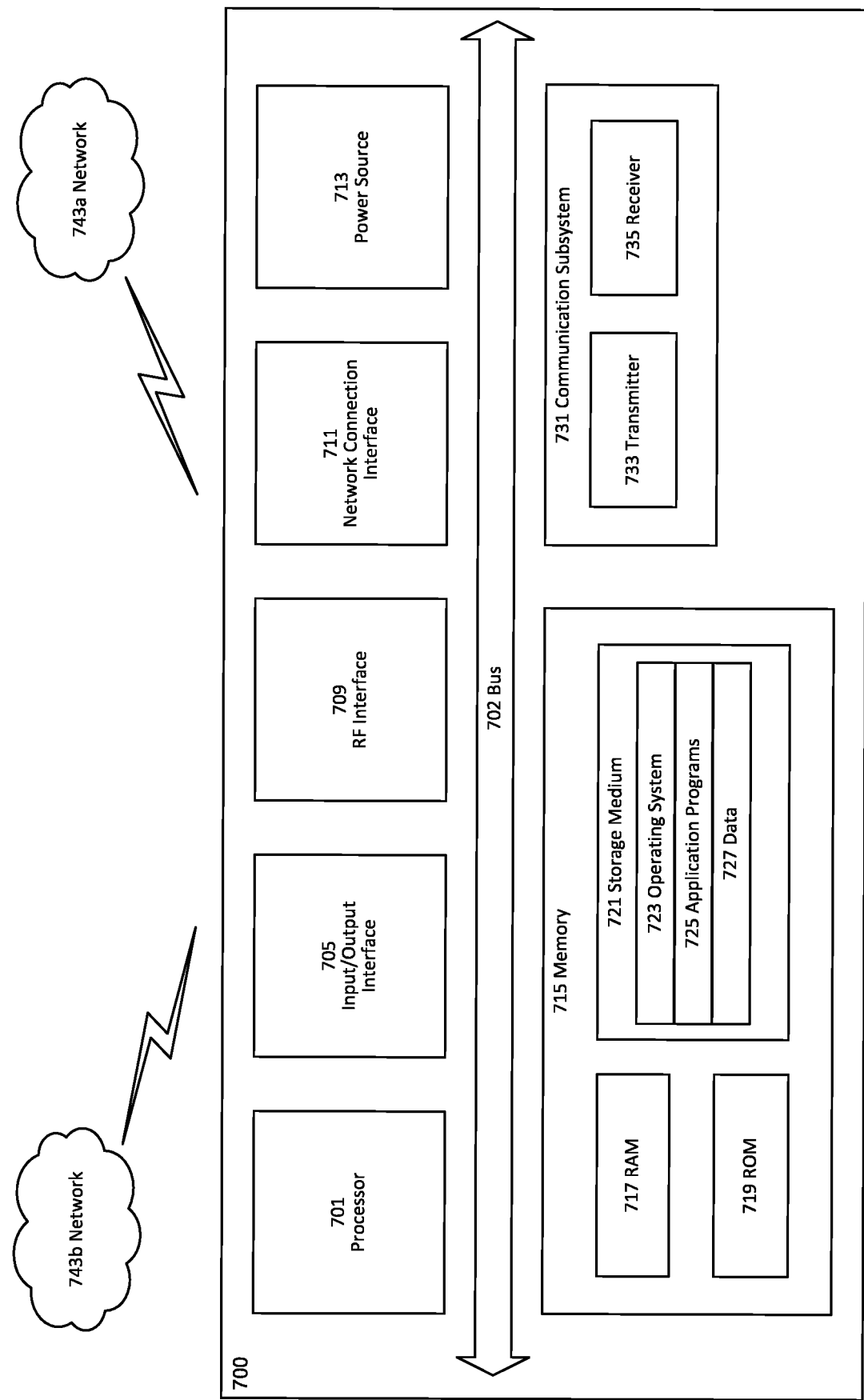
FIG. 7 illustrates one embodiment of a UE in accordance with various aspects.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
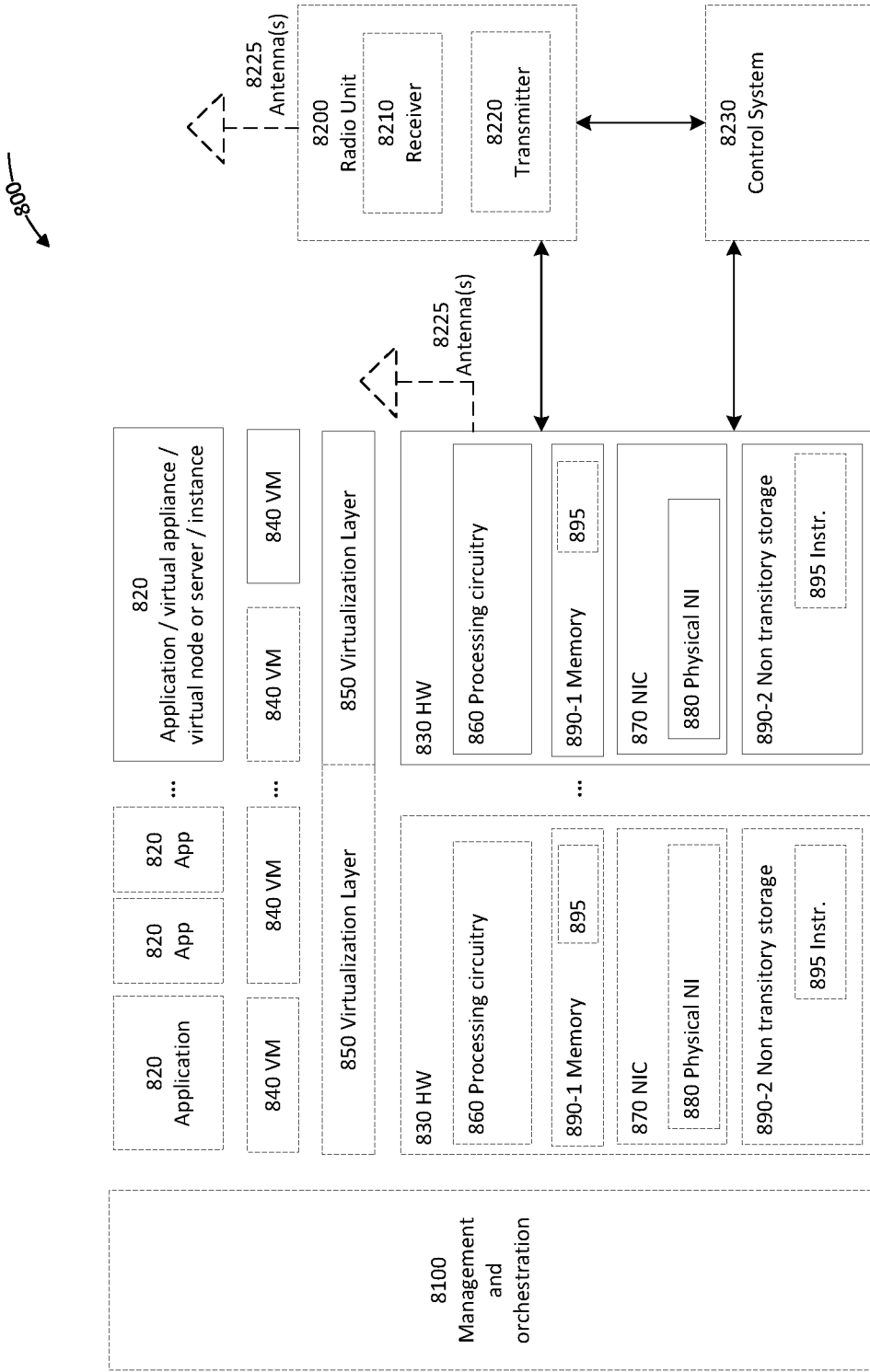
FIG. 8 is a schematic block diagram illustrating a virtualization environment according to some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
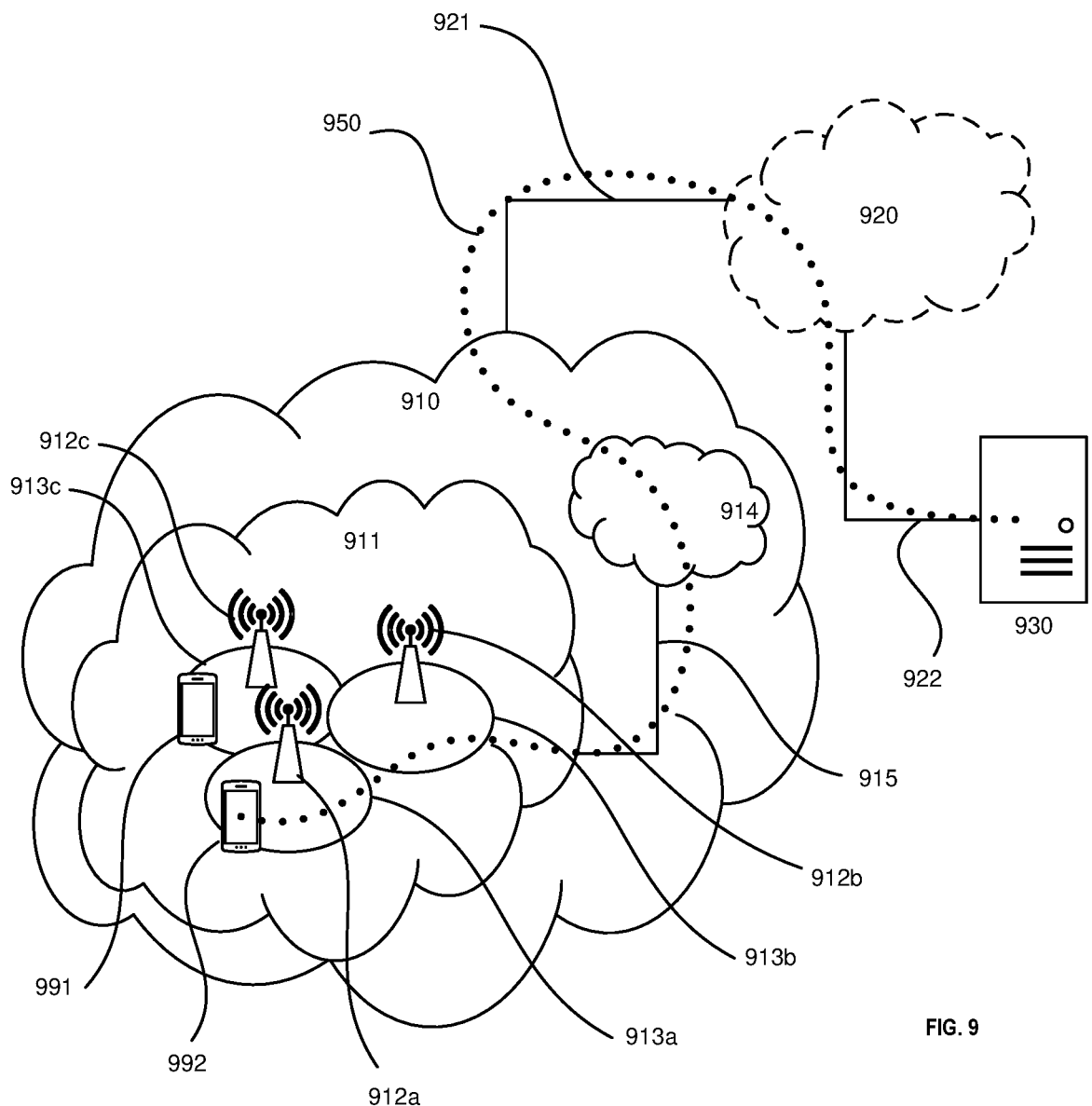
FIG. 9 schematically illustrates a telecommunication network connected via an intermediate network to a host computer.

With reference to FIG. 9, a communication system in accordance with an embodiment is shown. The illustrated communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
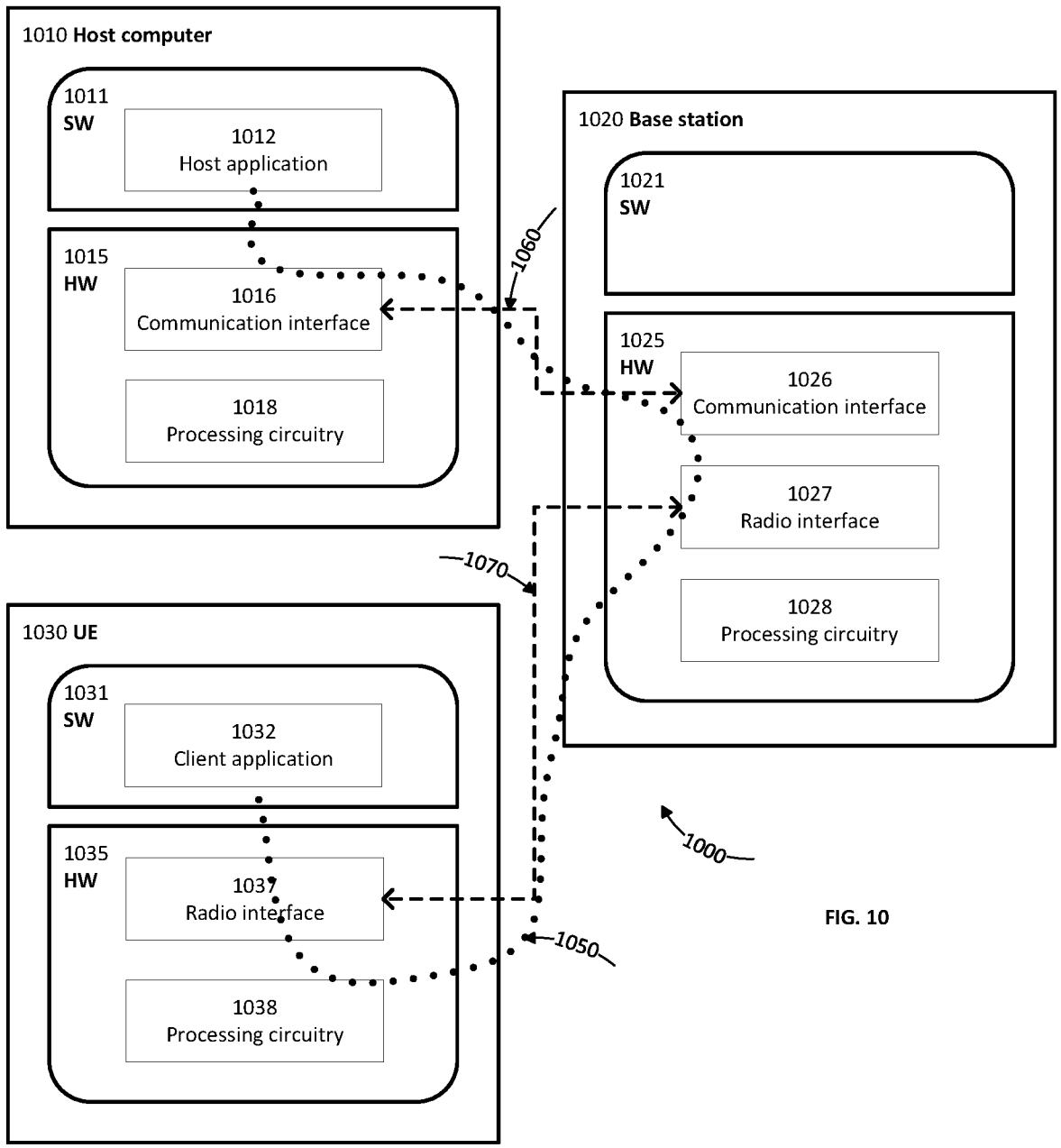
FIG. 10 is a generalized block diagram of a host computer communicating via a base station with a user equipment over a partially wireless connection.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve network performance by introducing new information in existing UE measurements on NR, the new information relating to the ability of a UE to camp on a neighbor NR and the new information being used by RANs (eNB/gNB) to make optimal decisions in different network scenarios, and thereby provide benefits such as improved ANR functionality, improved mobility handling, reduced handover failure, and simplified network management.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
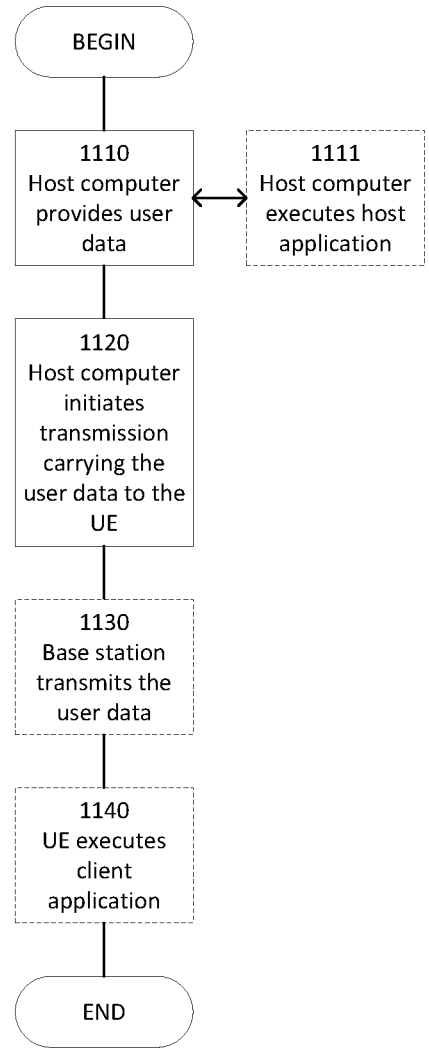
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
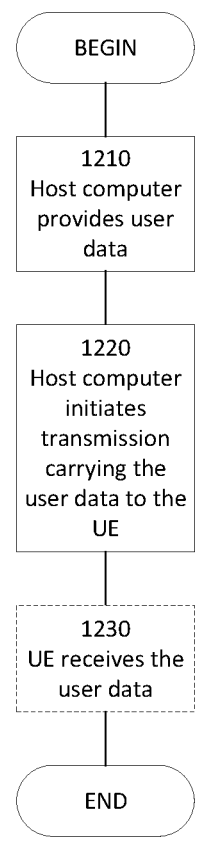
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
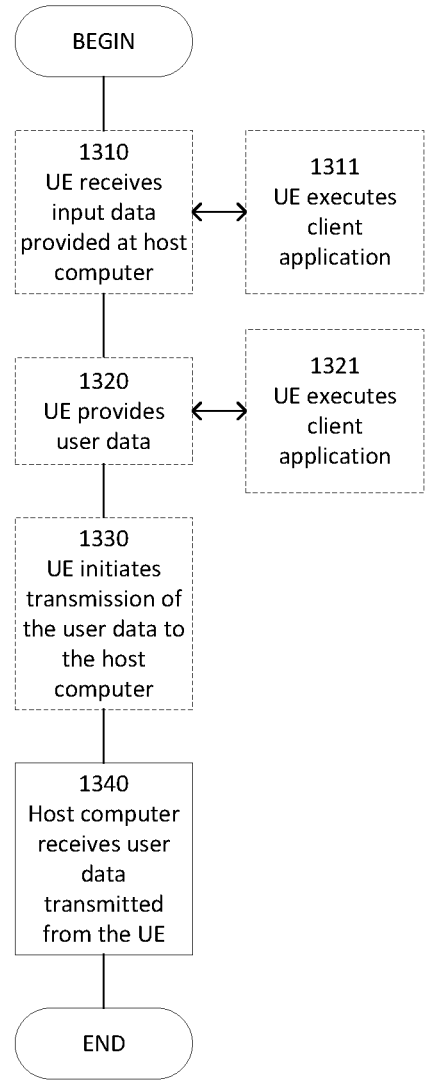
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
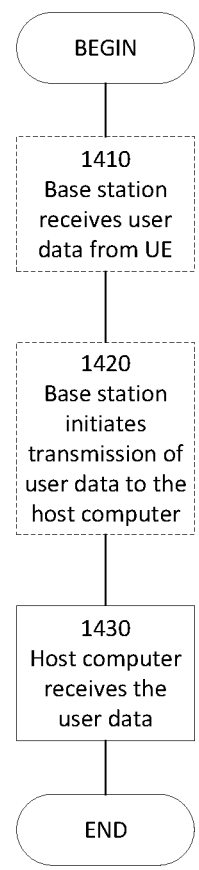
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
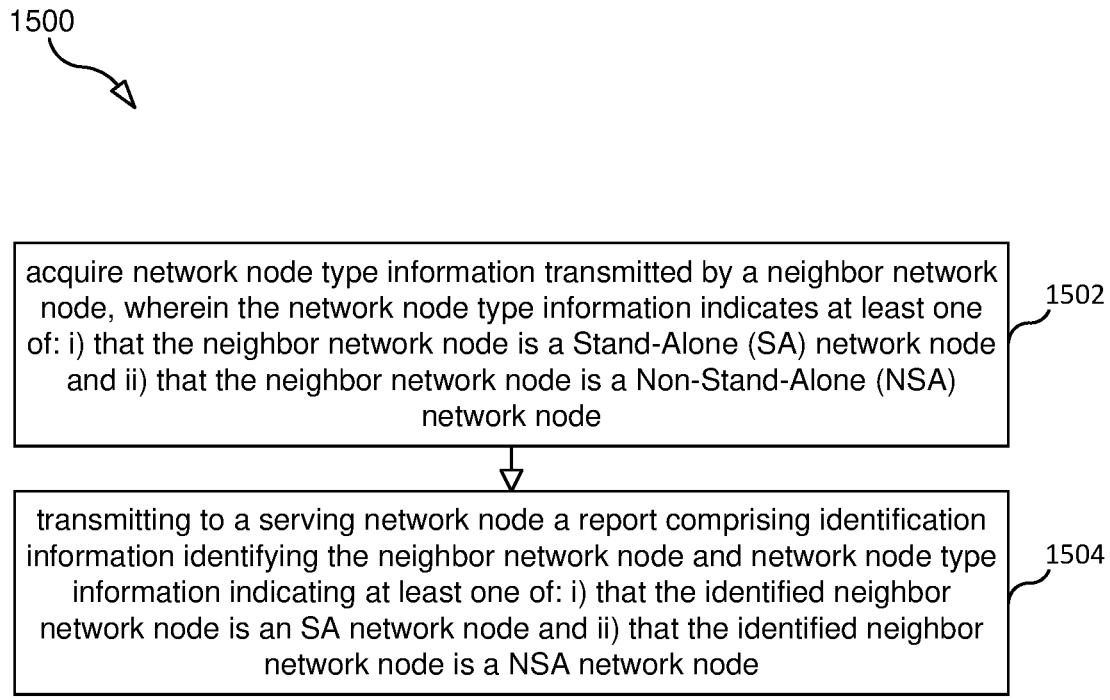
FIG. 15 is a flowchart illustrating a method implemented in a communication system including a host computer, a base station and a user equipment.

FIG. 15 depicts a method 1500, in accordance with particular embodiments, that is performed by a wireless device. Method 1500 may begin at step 1502 in which the wireless device acquires network node type information transmitted by a neighbor network node, wherein the network node type information indicates at least one of: i) that the neighbor network node is a Stand-Alone (SA) network node and ii) that the neighbor network node is a Non-Stand-Alone (NSA) network node. In some embodiments, the network node type information comprises or consists of an SA/NSA indicator. In some embodiments, the network node type information comprises at least one of: a Cell Global Identity (CGI), a Tracking Area Codes, a Core Network (CN) identifier, and a Public Land Mobile Network (PLMN) identifier. In such an embodiment, the wireless device derives the network node type of the neighbor network node based on the at least one of: the CGI, the Tracking Area Code, the CN identifier, and the PLMN identifier.

At step 1504, the wireless device transmits to a serving network node a report comprising identification information identifying the neighbor network node and network node type information indicating at least one of: i) that the identified neighbor network node is an SA network node and ii) that the identified neighbor network node is a NSA network node.

In some embodiments, the method further includes the wireless device: receiving from a network a cell identifier (e.g., PCI) for identifying the neighbor network node before acquiring network node type information transmitted by the neighbor network node; and using the cell identifier to acquire the network node type information transmitted by the neighbor network. In some embodiments, acquiring the network node type information transmitted by the neighbor network node comprises: receiving system information broadcast associated with the cell identifier, wherein the system information broadcast comprises the network node type information; and acquiring the network node type information from the received system information. In some embodiments, acquiring the network node type information transmitted by the neighbor network node comprises: transmitting a request to the neighbor network node for system information; receiving the requested system information from the neighbor network node, wherein the system information comprises the network node type information; and acquiring the network node type information from the received system information.

In some embodiments, method 1500 further includes the wireless device: after acquiring the network node type information transmitted by the neighbor network node, determining, based on the acquired network node type information, whether the neighbor network node is at least one of: i) a Stand-Alone (SA) network node and ii) a Non-Stand-Alone (NSA) network node.

Figure 16:
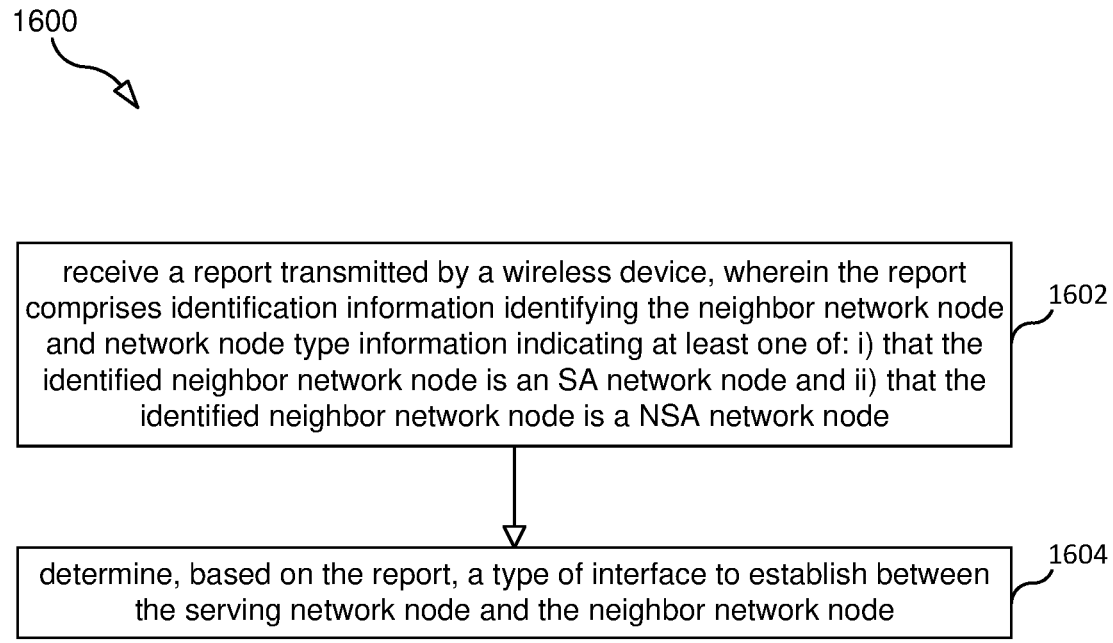
FIG. 16 is a flowchart illustrating a method implemented in a communication system including a host computer, a base station and a user equipment.

FIG. 16 depicts a method 1600, in accordance with particular embodiments, that is performed by a serving network node for establishing an interface with a neighbor network node. Method 1600 may begin at step 1602 in which the serving network node (e.g., base station) receives a report transmitted by a wireless device, wherein the report comprises identification information identifying the neighbor network node and network node type information indicating at least one of: i) that the identified neighbor network node is an SA network node and ii) that the identified neighbor network node is a NSA network node. At step 1604, the network node determines, based on the report, a type of interface to establish between the serving network node and the neighbor network node (e.g., an Xn connection interface).

In some embodiments, method 1600 further includes the serving network node storing the identification information identifying the neighbor network node and network node type information.

In some embodiments, method 1600 further includes the serving network node determining the network node type of the identified neighbor network node based on the report.

In some embodiments, the serving network node is an eNodeB, and method 1600 further comprises: based on a determination that the identified neighbor network node is a NSA network node, the serving network node determining whether the wireless device supports EUTRAN-New Radio Dual Connectivity (EN-DC); and based on a determination that the wireless device supports EUTRAN-New Radio Dual Connectivity (EN-DC), the serving network node configuring dual connectivity with the identified neighbor network node device.

In some embodiments, the serving network node is an eNodeB, and method 1600 further comprises: based on a determination that the identified neighbor network node is an SA and NAS network node, the serving network node determining whether the wireless device is compatible with both SA and NSA network nodes; and based on a determination that the wireless device is compatible with both SA and NSA network nodes, the serving network node initiating at least one of: (i) an Inter-Radio Access Technology (IRAT) handover to the identified neighbor network node and (ii) a configuration of EUTRAN-New Radio Dual Connectivity (EN-DC) with the identified neighbor network node.

In some embodiments, the serving network node is an eNodeB, and method 1600 further comprises: based on a determination that the identified neighbor network node is an SA network node, the serving network node determining whether the wireless device is compatible with SA network nodes; and based on a determination that the wireless device is compatible with SA network nodes, the serving network node initiating an Inter-Radio Access Technology (IRAT) handover to the identified neighbor network node.

In some embodiments, the serving network node is a SA network node, and method 1600 further comprises: based on a determination that the identified neighbor network node is a NSA network node, the serving network node deciding not to initiate a handover to the identified neighbor network node.

In some embodiments, the serving network node is a SA network node, and method 1600 further comprises: based on a determination that the identified neighbor network node is an SA network node, the serving network node initiating a handover to the identified neighbor network node.

In some embodiments, the serving network node is an NSA network node, and method 1600 further comprises: based on a determination that the identified neighbor network node is a NSA network node, the serving network node triggering a secondary network node modification procedure.

In some embodiments, the serving network node is an NSA network node, and method 1600 further comprises: based on a determination that the identified neighbor network node is an SA and NSA network node, the serving network node triggering a secondary network node modification procedure.

In some embodiments, the serving network node is an eNodeB connected to a 5th Generation Core network (5GC) and the neighbor network node is an SA network node connected to the 5GC.

Figure 17:
FIG. 17 is a flowchart illustrating a method implemented in a communication system including a host computer, a base station and a user equipment.
Figure 17:

FIG. 17 depicts a method 1700, in accordance with particular embodiments, that is performed by a network node. Method 1700 may begin at step 1702 in which the network node transmits network node type information (e.g., broadcasts the network node type information), wherein the network node type information indicates at least one of: i) that the network node is a Stand-Alone (SA) network node and ii) that the network node is a Non-Stand-Alone (NSA) network node. In some embodiments, the network node type information comprises or consists of an SA/NSA indicator. In some embodiments, the network node type information comprises at least one of: a Cell Global Identity (CGI), a Tracking Area Codes, a Core Network (CN) identifier, and a Public Land Mobile Network (PLMN) identifier.

Figure 18:
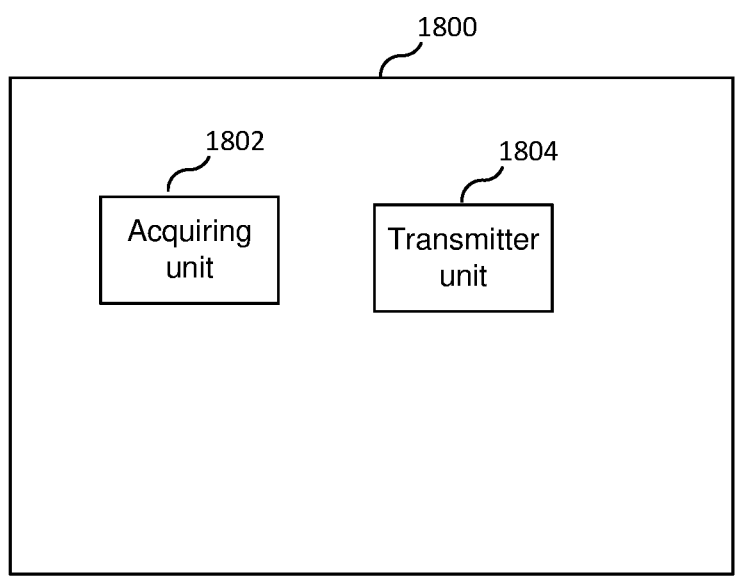
FIG. 18 illustrates a schematic block diagram of an apparatus in a wireless network.

FIG. 18 illustrates a schematic block diagram of an apparatus 1800 in a wireless network (for example, the wireless network shown in FIG. 6). The apparatus may be implemented in a wireless device or network node (e.g., wireless device 610 or network node 660 shown in FIG. 6). Apparatus 1800 is operable to carry out the example method described with reference to FIG. 15 and possibly any other processes or methods disclosed herein. It is also to be understood that the method of FIG. 15 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause acquiring unit 1802 to acquire network node type information transmitted by a neighbor network node, wherein the network node type information indicates at least one of: i) that the neighbor network node is a Stand-Alone (SA) network node and ii) that the neighbor network node is a Non-Stand-Alone (NSA) network node, transmitter unit 1804 to transmit to a serving network node a report comprising identification information identifying the neighbor network node and network node type information indicating at least one of: i) that the identified neighbor network node is an SA network node and ii) that the identified neighbor network node is a NSA network node, and any other suitable units of apparatus 1800 to perform corresponding functions according one or more embodiments of the present disclosure.

Figure 19:
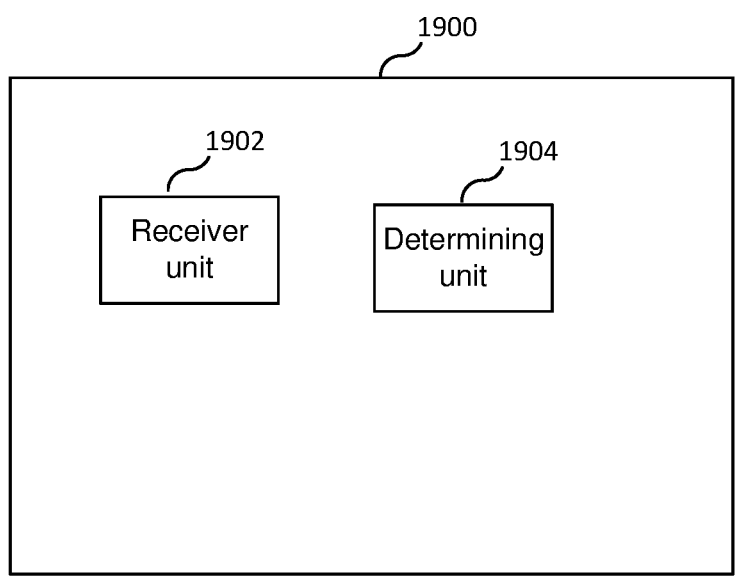
FIG. 19 illustrates a schematic block diagram of an apparatus in a wireless network.

FIG. 19 illustrates a schematic block diagram of an apparatus 1900 in a wireless network (for example, the wireless network shown in FIG. 6). The apparatus may be implemented in a wireless device or network node (e.g., wireless device 610 or network node 660 shown in FIG. 6). Apparatus 1900 is operable to carry out the example method described with reference to FIG. 16 and possibly any other processes or methods disclosed herein. It is also to be understood that the method of FIG. 16 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiver unit 1902 to receive a report transmitted by a wireless device, wherein the report comprises identification information identifying the neighbor network node and network node type information indicating at least one of: i) that the identified neighbor network node is an SA network node and ii) that the identified neighbor network node is a NSA network node, determiner unit 1904 to determine, based on the report, a type of interface to establish between the serving network node and the neighbor network node, and any other suitable units of apparatus 1900 to perform corresponding functions according one or more embodiments of the present disclosure.

Figure 20:
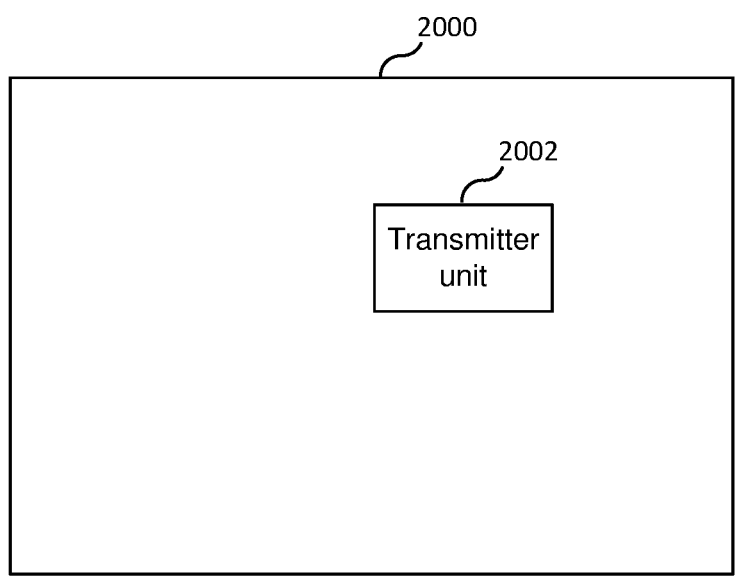
FIG. 20 illustrates a schematic block diagram of an apparatus in a wireless network.

FIG. 20 illustrates a schematic block diagram of an apparatus 2000 in a wireless network (for example, the wireless network shown in FIG. 6). The apparatus may be implemented in a wireless device or network node (e.g., wireless device 610 or network node 660 shown in FIG. 6). Apparatus 2000 is operable to carry out the example method described with reference to FIG. 17 and possibly any other processes or methods disclosed herein. It is also to be understood that the method of FIG. 17 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitter unit 2002 to transmit network node type information, wherein the network node type information indicates at least one of: i) that the network node is a Stand-Alone (SA) network node and ii) that the network node is a Non-Stand-Alone (NSA) network node, and any other suitable units of apparatus 2000 to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

EMBODIMENTS

Group A Embodiments—UE

A1. A method implemented in a wireless device, comprising: acquiring network node type information transmitted by a neighbor network node, wherein the network node type information indicates at least one of: i) that the neighbor network node is a Stand-Alone (SA) network node and ii) that the neighbor network node is a Non-Stand-Alone (NSA) network node; and transmitting to a serving network node a report comprising identification information identifying the neighbor network node and network node type information indicating at least one of: i) that the identified neighbor network node is an SA network node and ii) that the identified neighbor network node is a NSA network node.

A2. The method of A1, wherein the network node type information comprises an SA/NSA indicator.

A3. The method of A1, wherein the network node type information comprises at least one of: a Cell Global Identity (CGI), a Tracking Area Code, a Core Network (CN) identifier, and a Public Land Mobile Network (PLMN) identifier.

A4. The method of A3, further comprising: deriving the network node type of the neighbor network node based on the at least one of: the CGI, the Tracking Area Code, the CN identifier, and the PLMN identifier.

A5. The method of A1, further comprising: receiving from a network a cell identifier (e.g., PCI) for identifying the neighbor network node before acquiring network node type information transmitted by the neighbor network node; and using the cell identifier to acquire the network node type information transmitted by the neighbor network.

A6. The method of A5, wherein the acquiring the network node type information transmitted by the neighbor network node comprises: receiving system information broadcast associated with the cell identifier, wherein the system information broadcast comprises the network node type information; and acquiring the network node type information from the received system information.

A7. The method of A5, wherein the acquiring the network node type information transmitted by the neighbor network node comprises: transmitting a request to the neighbor network node for system information; receiving the requested system information from the neighbor network node, wherein the system information comprises the network node type information; and acquiring the network node type information from the received system information.

A8. The method of any one of A1-A7, further comprising: after acquiring the network node type information transmitted by the neighbor network node, determining, based on the acquired network node type information, whether the neighbor network node is at least one of: i) a Stand-Alone (SA) network node and ii) a Non-Stand-Alone (NSA) network node.

A9. The method of any of the previous embodiments, further comprising: providing user data; and forwarding the user data to a host computer via the transmission to a base station.

Group B Embodiments—Base Station

B1. A method performed by a serving network node for establishing an interface with a neighbor network node, comprising: receiving a report transmitted by a wireless device, wherein the report comprises identification information identifying the neighbor network node and network node type information indicating at least one of: i) that the identified neighbor network node is an SA network node and ii) that the identified neighbor network node is a NSA network node; and determining, based on the report, a type of interface to establish between the serving network node and the neighbor network node.

B2. The method of B1, further comprising: storing the identification information identifying the neighbor network node and network node type information.

B3. The method of B1 or B2, further comprising: determining the network node type of the identified neighbor network node based on the report.

B4. The method of B3, wherein the serving network node is an eNodeB, the method further comprising: based on a determination that the identified neighbor network node is a NSA network node, determining whether the wireless device supports EUTRAN-New Radio Dual Connectivity (EN-DC); and based on a determination that the wireless device supports EUTRAN-New Radio Dual Connectivity (EN-DC), configuring dual connectivity with the identified neighbor network node device.

B5. The method of B3, wherein the serving network node is an eNodeB, the method further comprising: based on a determination that the identified neighbor network node is an SA and NAS network node, determining whether the wireless device is compatible with both SA and NSA network nodes; and based on a determination that the wireless device is compatible with both SA and NSA network nodes, initiating at least one of: (i) an Inter-Radio Access Technology (IRAT) handover to the identified neighbor network node and (ii) a configuration of EUTRAN-New Radio Dual Connectivity (EN-DC) with the identified neighbor network node.

B6. The method of B3, wherein the serving network node is an eNodeB, the method further comprising: based on a determination that the identified neighbor network node is an SA network node, determining whether the wireless device is compatible with SA network nodes; and based on a determination that the wireless device is compatible with SA network nodes, initiating an Inter-Radio Access Technology (IRAT) handover to the identified neighbor network node.

B7. The method of B3, wherein the serving network node is a SA network node, the method further comprising: based on a determination that the identified neighbor network node is a NSA network node, deciding not to initiate a handover to the identified neighbor network node.

B8. The method of B3, wherein the serving network node is a SA network node, the method further comprising: based on a determination that the identified neighbor network node is an SA network node, initiating a handover to the identified neighbor network node.

B9. The method of B3, wherein the serving network node is a NSA network node, the method further comprising: based on a determination that the identified neighbor network node is a NSA network node, triggering a secondary network node modification procedure.

B10. The method of B3, wherein the serving network node is a NSA network node, the method further comprising: based on a determination that the identified neighbor network node is an SA and NSA network node, triggering a secondary network node modification procedure.

B11. The method of any one of B1-B10, wherein the determined type of interface to establish between the serving network node and the neighbor network node is an Xn connection interface.

B12. The method of B11, wherein the serving network node is an eNodeB connected to a 5th Generation Core network (5GC) and the neighbor network node is an SA network node connected to the 5GC.

B13. A method performed by a network node, comprising: transmitting network node type information, wherein the network node type information indicates at least one of: i) that the network node is a Stand-Alone (SA) network node and ii) that the network node is a Non-Stand-Alone (NSA) network node.

B14. The method of B13, wherein the network node type information comprises an SA/NSA indicator.

B15. The method of B13, wherein the network node type information comprises at least one or more Core Network (CN) identifiers and Public Land Mobile Network (PLMN) identifiers B16. The method of any one of B13-B15, wherein the step of transmitting the network node type information comprises broadcasting the network node type information.

B17. The method of any of the previous embodiments, further comprising: obtaining user data; and forwarding the user data to a host computer or a wireless device.

Group C Embodiments

C1. A wireless device comprising: processing circuitry configured to perform any of the steps of any of the Group A embodiments; and power supply circuitry configured to supply power to the wireless device.

C2. A base station comprising: processing circuitry configured to perform any of the steps of any of the Group B embodiments; power supply circuitry configured to supply power to the wireless device.

C3. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C4. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein: the processing circuitry of the host computer is configured to execute a host application, thereby providing the user data; and the UE comprises processing circuitry configured to execute a client application associated with the host application.

C8. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein: the processing circuitry of the host computer is configured to execute a host application, thereby providing the user data; and the UE's processing circuitry is configured to execute a client application associated with the host application.

C15. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein: the processing circuitry of the host computer is configured to execute a host application; and the UE's processing circuitry is configured to execute a client application associated with the host application, thereby providing the user data.

C21. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

C22. A method implemented in a communication system including a host computer, a base station and a user equipment (UE), the method comprising: at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising: at the UE, executing a client application, thereby providing the user data to be transmitted; and at the host computer, executing a host application associated with the client application.

C25. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein: the processing circuitry of the host computer is configured to execute a host application; the UE is configured to execute a client application associated with the host application, thereby providing the user data to be received by the host computer.

C30. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

REFERENCES

[1] 3GPP TS37.340

Abbreviations

At least some of the following abbreviations may be used in this disclosure. If there is an inconsistency between abbreviations, preference should be given to how it is used above. If listed multiple times below, the first listing should be preferred over any subsequent listing(s).
ANR Automatic Neighbor Relations
CA Carrier Aggregation
DC Dual Connectivity
EPC Evolved Packet Core
EN-DC Eutran-NR Dual Connectivity
eNB RAN node (RBS) supporting LTE radio access technology
gNB RAN node (RBS) supporting NR radio access technology
LTE Long Term Evolution
MCGMaster Cell Group (related to master node in dual connectivity)
MeNB Master eNB
MN Master Node
MR-DC Multi-Radio DC
NR New Radio (5G)
NCGI NR Cell Global Identity
NSA Non-Stand-alone NR
PCI Physical Cell Identity
RAN Radio Access Network
RAT Radio Access Technology
RBS Radio Base Station
SA Stand-alone NR
SCG Secondary Cell Group (related to secondary node in dual connectivity)
SgNB Secondary gNB
SN Secondary Node
UE User Equipment
1×RTT CDMA2000 1× Radio Transmission Technology
3GPP3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel DUT Device Under Test
E-CID Enhanced Cell-ID (positioning method)
E-SMLC Evolved-Serving Mobile Location Centre
ECGIEvolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MB SFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAMQuadrature Amplitude Modulation
RAN Radio Access Network
RAT Radio Access Technology
RLM Radio Link Management
RNC Radio Network Controller
RNTIRadio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method performed by a communication device comprising a receiver and a transmitter, the method comprising:
the communication device acquiring network support information associated with a neighbor cell received from a neighbor new radio (NR) network node, wherein the network support information indicates whether the neighbor cell supports a Stand-Alone (SA) mode of operation and/or a Non-Stand-Alone (NSA) mode of operation, and wherein a neighbor cell supporting the SA mode of operation has a control plane connection to a core network, and wherein a neighbor cell supporting the NSA mode operation and not the SA mode of operation does not have a control plane connection to a core network; and
the communication device employing the transmitter of the communication device to transmit to a serving network node a report comprising network support information indicating whether the neighbor cell supports the SA mode of operation or the NSA mode of operation.
2. The method of claim 1, wherein the network support information comprises at least one of: a Cell Global Identity (CGI), a Tracking Area Code, a Core Network (CN) identifier, or a Public Land Mobile Network (PLMN) identifier.
3. The method of claim 2, further comprising:
deriving whether the neighbor cell supports the SA mode of operation or NSA mode of operation based on a presence or an absence of certain network support information.
4. The method of claim 1, further comprising:
receiving from a network a cell identifier for identifying the neighbor cell before acquiring the network support information; and
using the cell identifier to acquire the network support information.

5. The method of claim 4, wherein acquiring the network support information comprises:
receiving system information associated with the cell identifier, wherein the system information was broadcast and comprises the network support information; and
acquiring the network support information from the received system information.

6. The method of claim 4, wherein acquiring the network support information comprises:
transmitting a request for system information to the neighbor NR network node;
receiving the requested system information from the neighbor NR network node, wherein the system information comprises the network support information; and
obtaining the network support information from the received system information.

7. The method of claim 1, further comprising:
after acquiring the network support information, determining, based on the acquired network support information, whether the neighbor cell supports the SA mode of operation or the NSA mode of operation.

8. A method performed by a serving network node for establishing an interface between a serving cell of the serving network node and a neighbor cell of neighbor new radio (NR) network node, the method comprising:
the serving network node receiving a report transmitted by a communication device, wherein the report comprises network support information indicating whether the neighbor cell supports a Stand-Alone (SA) mode of operation and/or a Non-Stand-Alone (NSA) mode of operation; and
the serving network node determining, based on the report, i) a type of interface to establish between the serving cell and the neighbor cell or ii) whether an interface between the serving cell and the neighbor cell should be established, wherein
if the neighbor cell supports the SA mode of operation, then the neighbor cell has a control plane connection to a core network, and
if the neighbor cell supports the NSA mode operation and not the SA mode of operation, then the neighbor cell does not have a control plane connection to a core network.

9. The method of claim 8, wherein the type of interface to establish between the serving network cell and the neighbor cell is one of an X2 interface or an Xn interface.

10. The method of claim 8, wherein the serving network node is an eNodeB, and the method further comprises:
based on a determination that the neighbor cell supports the NSA mode of operation, determining whether the communication device supports EUTRAN-New Radio Dual Connectivity (EN-DC); and
based on a determination that the communication device supports EUTRAN-New Radio Dual Connectivity (EN-DC), configuring dual connectivity with the neighbor cell.

11. The method of claim 8, wherein the serving network node is an eNodeB, and the method further comprises:
based on a determination that the neighbor cell supports the SA mode of operation and the NSA mode of operation, determining whether the communication device support both the SA and the NSA modes of operation; and
based on a determination that the communication device supports both the SA and the NSA modes of operation, initiating at least one of: (i) an Inter-Radio Access Technology (IRAT) handover to the neighbor cell or (ii) a configuration of EUTRAN-New Radio Dual Connectivity (EN-DC) with the neighbor cell.

12. The method of claim 8, wherein the serving network node is an eNodeB, and the method further comprises:
based on a determination that the neighbor cell supports the SA mode of operation, determining whether the communication device supports the SA mode of operation; and
based on a determination that the communication device supports the SA mode of operation, initiating an Inter-Radio Access Technology (IRAT) handover to the neighbor cell.

13. The method of claim 8, wherein the serving network node is a gNodeB operating in the SA mode of operation, and the method further comprises:
based on a determination that the neighbor cell only supports the NSA mode of operation, deciding not to initiate a handover to the identified neighbor NR network node.

14. The method of claim 8, wherein the serving network node is a gNodeB operating in the SA mode of operation, and the method further comprises:
based on a determination that the neighbor cell supports the SA mode of operation, initiating a handover to the neighbor cell.

15. The method of claim 8, wherein the serving network node is a gNodeB operating in the NSA mode of operation, and the method further comprises:
based on a determination that the neighbor cell only supports NSA mode of operation, triggering a secondary network node modification procedure.

16. The method of claim 8, wherein the serving network node is a gNodeB operating in the NSA mode of operation, and the method further comprises:
based on a determination that the neighbor cell supports both SA and NSA modes of operation, triggering a secondary network node modification procedure.

17. The method of claim 8, wherein the determined type of interface to establish between the serving network node and the neighbor NR network node is an Xn connection interface.

18. The method of claim 17, wherein the serving network node is an eNodeB connected to a 5th Generation Core (5GC) network and the neighbor NR network node is gNodeB in the SA mode of operation and connected to the 5GC network.

19. A communication device, the communication device comprising:
a transmitter; and
processing circuitry, wherein the communication device is configured to:
acquire network support information associated with a neighbor cell provided by a neighbor new radio (NR) network node, wherein the network support information indicates whether the neighbor cell supports a Stand-Alone (SA) mode of operation and/or a Non-Stand-Alone (NSA) mode of operation, and wherein, if the neighbor cell supports the SA mode of operation, the neighbor cell has a control plane connection to a core network, and, if the neighbor cell supports the NSA mode operation and not the SA mode of operation, the neighbor cell does not have a control plane connection to a core network; and
employ the transmitter to transmit to the serving network node a report comprising identification information associated with the neighbour cell and the network support information indicating whether the neighbor cell supports the SA mode of operation or the NSA mode of operation.

20. A computer program product comprising a non-transitory computer readable medium storing a computer program comprising instructions which, when executed on at least one processor of a communication device, causes the communication device to perform the method of claim 1.

21. A network node configured to establish an interface between a serving cell of the network node and a neighbor cell of a neighbor new radio (NR) network node, the serving network node comprising:
- a receiver for receiving a report transmitted by a communication device, wherein the report comprises network support information indicating whether the neighbor cell supports a Stand-Alone (SA) mode of operation and/or a Non-Stand-Alone (NSA) mode of operation, and wherein, if the neighbor cell supports the SA mode of operation, the neighbor cell has a control plane connection to a core network, and, if the neighbor cell supports the NSA mode operation and not the SA mode of operation, the neighbor cell does not have a control plane connection to a core network; and
- processing circuitry for determining, based on the report, i) a type of interface to establish between the serving cell and the neighbor cell or ii) whether an interface between the serving cell and the neighbor cell should be established.

* * * * *

UNITED STATES PATENT AND TRADEMARK OFFICE
CERTIFICATE OF CORRECTION

| | |
|---|---|
| PATENT NO. | : 11,641,603 B2 |
| APPLICATION NO. | : 17/147706 |
| DATED | : May 2, 2023 |
| INVENTOR(S) | : Pakniat et al. |

It is certified that error appears in the above-identified patent and that said Letters Patent is hereby corrected as shown below:

On the Title Page

On Page 2, in Item (56), under "OTHER PUBLICATIONS", in Column 1, Line 10, delete "VVG2 #99bis," and insert -- WG2 #99bis, --, therefor.

On Page 2, in Item (56), under "OTHER PUBLICATIONS", in Column 1, Line 13, delete "R1-1718773," and insert -- R1-1718778, --, therefor.

On Page 2, in Item (56), under "OTHER PUBLICATIONS", in Column 2, Line 2, delete "Hangzou," and insert -- Hangzhou, --, therefor.

On Page 2, in Item (56), under "OTHER PUBLICATIONS", in Column 2, Line 11, delete "ad Hoc;" and insert -- adhoc; --, therefor.

On Page 2, in Item (56), under "OTHER PUBLICATIONS", in Column 2, Line 33, delete "adHoc;" and insert -- adhoc; --, therefor.

On Page 2, in Item (56), under "OTHER PUBLICATIONS", in Column 2, Line 47, delete "Telekcom" and insert -- Telekom --, therefor.

In the Drawings

In Fig. 6, Sheet 6 of 20, for Tag "672", in Line 1, delete "Tranceiver" and insert -- Transceiver --, therefor.

In Fig. 6, Sheet 6 of 20, for Tag "674", in Lines 1-2, delete "Baseband Circuitry" and insert -- Baseband Processing Circuitry --, therefor.

In Fig. 6, Sheet 6 of 20, delete "670 Wireless Signal".

Signed and Sealed this
Twelfth Day of December, 2023

Katherine Kelly Vidal
*Director of the United States Patent and Trademark Office*

CERTIFICATE OF CORRECTION (continued)
U.S. Pat. No. 11,641,603 B2

In Fig. 6, Sheet 6 of 20, for Tag "616", in Line 1, delete "Amplifier(S)" and insert -- Amplifier(s) --, therefor.

In Fig. 6, Sheet 6 of 20, for Tag "618", in Line 1, delete "Filter(S)" and insert -- Filter(s) --, therefor.

In Fig. 6, Sheet 6 of 20, for Tag "622", in Line 1, delete "Tranceiver" and insert -- Transceiver --, therefor.

In Fig. 6, Sheet 6 of 20, for Tag "624", in Lines 1-2, delete "Baseband Circuitry" and insert -- Baseband Processing Circuitry --, therefor.

In Fig. 7, Sheet 7 of 20, for Tag "701", in Line 1, delete "Processor" and insert -- Processing Circuitry --, therefor.

In Fig. 13, Sheet 13 of 20, for Step "1310", in Line 3, delete "provided at" and insert -- provided by --, therefor.

In the Specification

In Column 1, Line 7, delete "section 371" and insert -- § 371 --, therefor.

In Column 1, Line 8, delete "US 2019-0357095)," and insert -- US 2019-0357095), now Pat. No. 10,911,993, --, therefor.

In Column 3, Line 60, delete "one of i)" and insert -- one of: i) --, therefor.

In Column 4, Lines 8-9, delete "cell global identifier (CGI)" and insert -- cell global identity (CGI) --, therefor.

In Column 9, Line 3, delete "embodiments:" and insert -- embodiments. --, therefor.

In Column 9, Line 58, delete "TS37.340)" and insert -- TS37.340). --, therefor.

In Column 10, Line 5, delete "some the" and insert -- some of the --, therefor.

In Column 12, Line 2, delete "(WiMax)," and insert -- (WiMAX), --, therefor.

In Column 13, Line 21, delete "NodeB's." and insert -- NodeBs. --, therefor.

In Column 13, Line 22, delete "considered a" and insert -- considered as a --, therefor.

In Column 13, Line 62, delete "(SOC)." and insert -- (SoC). --, therefor.

In Column 14, Line 5, delete "units" and insert -- units. --, therefor.

In Column 15, Line 10, delete "considered a" and insert -- considered as a --, therefor.

In Column 15, Lines 19-20, delete "radio front end circuitry 690" and insert -- radio front end circuitry 692 --, therefor.

In Column 15, Line 64, delete "integrated in," and insert -- integrated into, --, therefor.

In Column 16, Line 29, delete "a wireless cameras," and insert -- a wireless camera, --, therefor.

In Column 16, Line 35, delete "(CPE)." and insert -- (CPE), --, therefor.

In Column 16, Line 49, delete "narrow band" and insert -- narrowband --, therefor.

In Column 16, Line 53, delete "etc.) personal" and insert -- etc.), personal --, therefor.

In Column 17, Line 18, delete "considered an" and insert -- considered as an --, therefor.

In Column 17 , Lines 21-22, delete "Radio front end circuitry 614" and insert -- Radio front end circuitry 612 --, therefor.

In Column 17, Line 31, delete "considered a" and insert -- considered as a --, therefor.

In Column 17, Line 64, delete "SOC." and insert -- SoC. --, therefor.

In Column 19, Line 10, delete "proximity or" and insert -- proximity sensor or --, therefor.

In Column 19, Line 64, delete "UE 7200" and insert -- UE 700 --, therefor.

In Column 20, Line 6, delete "interchangeable." and insert -- interchangeably. --, therefor.

In Column 20, Lines 14-15, delete "power source 733," and insert -- power source 713, --, therefor.

In Column 21, Line 39, delete "data file 727." and insert -- data 727. --, therefor.

In Column 21, Lines 46-47, delete "high-density digital versatile disc (HD-DVD)" and insert -- high-definition digital versatile disc (HD-DVD) --, therefor.

In Column 21, Line 53, delete "user identity (SIM/RUIM) module," and insert -- user identity module (SIM/RUIM), --, therefor.

In Column 22, Line 7, delete "WiMax," and insert -- WiMAX, --, therefor.

In Column 23, Lines 17-18, delete "memory 890. Memory 890," and insert -- memory 890-1. Memory 890-1, --, therefor.

In Column 24, Line 3, delete "onto" and insert -- into --, therefor.

CERTIFICATE OF CORRECTION (continued)
U.S. Pat. No. 11,641,603 B2

In Column 24, Line 15, delete "virtual network elements" and insert -- virtual network element --, therefor.

In Column 27, Line 22, delete "in that" and insert -- such that --, therefor.

In Column 28, Line 11, delete "substep" and insert -- step --, therefor.

In Column 28, Line 36, delete "more microprocessor" and insert -- more microprocessors --, therefor.

In Column 28, Line 50, delete "according one" and insert -- according to one --, therefor.

In Column 30, Line 7, delete "NAS network node," and insert -- NSA network node, --, therefor.

In Column 30, Line 49, delete "5th Generation Core network (5GC)" and insert -- 5th Generation Core Network (5GCN) --, therefor.

In Column 31, Line 12, delete "more microprocessor" and insert -- more microprocessors --, therefor.

In Column 31, Line 38, delete "according one" and insert -- according to one --, therefor.

In Column 31, Line 53, delete "more microprocessor" and insert -- more microprocessors --, therefor.

In Column 32, Line 6, delete "determiner unit 1904" and insert -- determining unit 1904 --, therefor.

In Column 32, Line 11, delete "according one" and insert -- according to one --, therefor.

In Column 32, Line 26, delete "more microprocessor" and insert -- more microprocessors --, therefor.

In Column 32, Line 45, delete "according one" and insert -- according to one --, therefor.

In Column 34, Line 28, delete "NAS network node," and insert -- NSA network node, --, therefor.

In Column 35, Lines 6-7, delete "5th Generation Core network (5GC)" and insert -- 5th Generation Core Network (5GCN) --, therefor.

In Column 35, Line 20, delete "identifiers" and insert -- identifiers. --, therefor.

In Column 35, Line 61, delete "pervious" and insert -- previous --, therefor.

In Column 36, Lines 22-23, delete "to performs the of the previous" and insert -- to perform any of the previous --, therefor.

In Column 38, Line 8, delete "is an" and insert -- is any --, therefor.

In Column 38, Line 16, delete "Eutran-NR" and insert -- EUTRAN-NR --, therefor.

CERTIFICATE OF CORRECTION (continued)
U.S. Pat. No. 11,641,603 B2

In Column 38, Line 22, delete "MCGMaster" and insert -- MCG Master --, therefor.

In Column 38, Line 51, delete "CDMA Code Division Multiplexing Access" and insert -- CDMA Code Division Multiple Access --, therefor.

In Column 38, Line 52, delete "CGI Cell Global Identifier" and insert -- CGI Cell Global Identity --, therefor.

In Column 38, Line 58, delete "information" and insert -- Information --, therefor.

In Column 39, Line 3, delete "E-SMLC Evolved-Serving Mobile Location Centre".

In Column 39, Line 4, delete "ECGIEvolved" and insert -- ECGI Evolved --, therefor.

In Column 39, Line 7, delete "E-SMLC evolved Serving Mobile Location Center" and insert -- E-SMLC Enhanced Serving Mobile Location Center --, therefor.

In Column 39, Line 25, delete "MB SFN" and insert -- MBSFN --, therefor.

In Column 39, Line 45, delete "PDP Profile Delay Profile" and insert -- PDP Power Delay Profile --, therefor.

In Column 39, Line 50, delete "PMI Precoder Matrix Indicator" and insert -- PMI Precoding Matrix Indicator --, therefor.

In Column 39, Line 57, delete "QAMQuadrature" and insert -- QAM Quadrature --, therefor.

In Column 39, Line 60, delete "RLM Radio Link Management" and insert -- RLM Radio Link Monitoring --, therefor.

In Column 39, Line 62, delete "RNTIRadio" and insert -- RNTI Radio --, therefor.

In Column 40, Line 14, delete "SON Self Optimized Network" and insert -- SON Self-Organizing Network --, therefor.

In Column 40, Line 24, delete "UMTS Universal Mobile Telecommunication System" and insert -- UMTS Universal Mobile Telecommunications System --, therefor.

In Column 40, Line 29, delete "WCDMA Wide CDMA" and insert -- WCDMA Wideband CDMA --, therefor.

In Column 40, Line 30, delete "WLAN Wide Local Area Network" and insert -- WLAN Wireless Local Area Network --, therefor.

In the Claims

In Column 40, Line 44, in Claim 1, delete "NSA mode operation" and insert -- NSA mode of operation --, therefor.

In Column 41, Line 41, in Claim 8, delete "NSA mode operation" and insert -- NSA mode of operation --, therefor.

In Column 42, Line 62, in Claim 19, delete "NSA mode operation" and insert -- NSA mode of operation --, therefor.

In Column 42, Lines 65-66, in Claim 19, delete "the serving network node" and insert -- a serving network node --, therefor.

In Column 42, Line 67, in Claim 19, delete "the neighbour cell" and insert -- the neighbor cell --, therefor.

In Column 43, Line 21, in Claim 21, delete "NSA mode operation" and insert -- NSA mode of operation --, therefor.